(12) United States Patent
Usui

(10) Patent No.: US 8,290,805 B2
(45) Date of Patent: Oct. 16, 2012

(54) PROJECT MANAGEMENT SYSTEM

(76) Inventor: Hirokazu Usui, Nogoya (JP)

( * ) Notice: Subject to any disclaimer, the term of this patent is extended or adjusted under 35 U.S.C. 154(b) by 1885 days.

(21) Appl. No.: 10/939,872

(22) Filed: Sep. 13, 2004

(65) Prior Publication Data

US 2007/0067196 A1    Mar. 22, 2007

(51) Int. Cl.
*G06Q 10/00*    (2012.01)
(52) U.S. Cl. ............... 705/7.15; 705/7.13; 705/7.21
(58) Field of Classification Search ............ 705/7.13, 705/7.15, 7.21
See application file for complete search history.

(56) References Cited

U.S. PATENT DOCUMENTS

| | | | |
|---|---|---|---|
| 5,548,506 A | 8/1996 | Srinivasan | |
| 6,101,481 A | 8/2000 | Miller | |
| 7,082,457 B1* | 7/2006 | Burianek et al. | 709/204 |
| 7,159,206 B1* | 1/2007 | Sadhu et al. | 717/101 |
| 7,330,822 B1* | 2/2008 | Robson et al. | 705/7.15 |
| 7,627,581 B2* | 12/2009 | Flam | 1/1 |
| 2002/0055832 A1* | 5/2002 | Donelan et al. | 703/22 |
| 2002/0082895 A1 | 6/2002 | Budka | |
| 2002/0178036 A1 | 11/2002 | Murata | |
| 2002/0188597 A1* | 12/2002 | Kern et al. | 707/1 |
| 2003/0014409 A1* | 1/2003 | Shukoor | 707/7 |
| 2003/0033191 A1* | 2/2003 | Davies et al. | 705/10 |
| 2004/0210470 A1 | 10/2004 | Rusk | |
| 2005/0159968 A1* | 7/2005 | Cozzolino | 705/1 |
| 2005/0257136 A1* | 11/2005 | Charisius et al. | 715/511 |

OTHER PUBLICATIONS

Stover, Microsoft Office Project 2003 Inside/Out, 1088 pg. (online excerpts p. 1-126), Oct. 1, 2003.*
Shukoor, U.S. Appl. No. 60/304,679, Jul. 11, 2001, p. 1-34.*
IDprojectview, User Guide, Release 2.1, 2000, p. 1-174.*

* cited by examiner

*Primary Examiner* — Justin M Pats
(74) *Attorney, Agent, or Firm* — Luedeka Neely Group, P.C.

(57) ABSTRACT

A project management system having executable program modules, including a first module to create a requirement by a requestor. A second module receives an identity of a first receiver and sends the requirement to the first receiver. A third module sends an acceptance of the requirement to the requestor, and a fourth module sends a rejection to the requestor as specified by the first receiver. A fifth module sends a notification of completion of the requirement from the first receiver to the requester. A sixth module partitions the requirement into sub requirements as specified by the first receiver. The first receiver uses the second module to send the selectable number of sub requirements to at least one second receiver. The second receivers use the third, fourth, and fifth modules to respond to the first receiver, and also use the sixth module to further partition the sub requirements.

3 Claims, 26 Drawing Sheets

| | |
|---|---|
| 60 | Create Sub Request |
| 62 | Create My_Job |
| 64 | Add Memo |
| 66 | Send Request |
| 68 | Delete Request |
| 70 | Set Planned Status to the Requirement |
| 72 | Set Completed Status to the Requirement |
| 74 | Confirm the Completion of Request |
| 76 | Refuse the Completion of Request |
| 78 | Draft |
| 80 | Open |

Fig. 3

| | Job Request | |
|---|---|---|
| Parent Req. | Parent req. Title-1, Parent req. Title-2 | Show All |
| Req. Authorizer | < PersonName@mail.com>< PersonName@mail.com>< PersonName@mail.com> | |
| Req. Sender | < PersonName@mail.com> | |
| Req., Receiver | < PersonName@mail.com> | |
| Observer | < PersonName@mail.com> | |
| Access Ctrl. | ⊙ Prevent Access from Upper Req. ⊙ Prevent Access from Down Req. | |
| Due date | ⊙ Auto Calk  ⊙ Explicit   DUE 03/11/30 | |
| ESD/ECD of Req. | ESD;YY/MM/DD   ECD;YY/MM/DD | |
| DUE-ECD of Prj. | 0 | |
| Status | All Planned | |
| Progress of Req. | R-Req./R-Job/C-Job/All = 3/2/15/20    15%/10%/75% | Show His. |
| Title | Req.; Ship Product A | |
| Body of Req. | Please ship product A as following<br><br>1 destination,,,,,<br>2 date.... | |

- 110 Parent Req.
- 112 Req. Authorizer
- 114 Req. Sender
- 116 Req., Receiver
- 118 Observer
- 120 Access Ctrl.
- 122 Due date
- 124 ESD/ECD of Req.
- 126 DUE-ECD of Prj.
- 128 Status
- 130 Progress of Req.
- 132 Title
- 134 Body of Req.
- 136
- 138
- 140
- 142
- 144

| Child Req.<br>My Job | Due date | Receiver | Status | Title |
|---|---|---|---|---|
| | YYYYMMDD | usui | XXXXXX | XXXXXX |
| | YYYYMMDD | usui | XXXXXX | XXXXXX |

| Additional Post | Posted Date | Sender | Title |
|---|---|---|---|
| | YYYYMMDD | usui | XXXXXX |
| | YYYYMMDD | usui | XXXXXX |

| Accessible Board<br>or Discussion<br>Board | Title |
|---|---|
| | XXXXXX |
| | XXXXXX |

| Meeting | Meeting Date | Sender | Title |
|---|---|---|---|
| | YYYYMMDD | usui | XXXXXX |
| | YYYYMMDD | usui | XXXXXX |

Fig. 4

| | My-Job | | |
|---|---|---|---|
| 150 → | | | |
| 152 — Parent Req. | Parent req. Title-1, Parent req. Title-2 | | Show All |
| 154 — Job Planner | < PersonName@mail.com > | | |
| 156 — Observer | < PersonName@mail.com > | | |
| — Access Ctrl. | ⊙ Prevent Access from Upper Req. | | |
| 158 — Due date | 2003/11/30 | | |
| 160 — ESD/ECD of Job | ESD;YY/MM/DD | ECD;YY/MM/DD | |
| — DUE-ECD of Prj. | 0 | | |
| 162 — J-Time/S-Days | 10 Hr / 4 Days | | |
| 164 — Progress | Used / Today's / Total = 3/6/10  50% | | |
| 166 — Status | All Planned | | |
| 168 — Title | Req.; Ship Product A | | |
| 170 — 172 — 174 — 176 — Body of Req. | Please ship product A as following<br><br>1 destination,,,,,<br>2 date.... | | |
| 178 — Additional Post | Posted Date | Sender | Title |
| | YYYYMMDD | usui | XXXXXX |
| | YYYYMMDD | usui | XXXXXX |
| 180 — Accessible Board or Discussion Board | Title | | |
| | XXXXXX | | |
| | XXXXXX | | |
| Meeting | Meeting Date | Sender | Title |
| | YYYYMMDD | usui | XXXXXX |
| | YYYYMMDD | usui | XXXXXX |

Fig. 5

| | | | | My Job | |
|---|---|---|---|---|---|
| Due date | Prj Due -ECD | J-Time Progress | Crit | Status | Title |
| YYMMDD | -1 | 3/6 33% | (o) | Stacked | XXXXXX |
| YYMMDD | 0 | 2/10 20% | (●) | Completed | XXXXXX |
| YYMMDD | 0 | 5/20 25% | (o) | CAN Start | XXXXXX |
| YYMMDD | 0 | 0/20 0% | (●) | CAN Start | XXXXXX |
| YYMMDD | -1 | 0/10 0% | (o) | All Planned | XXXXXX |

Fig. 6

| | | Posted Memo |
|---|---|---|
| Date | Sender | Title |
| YYYYMMDD | sender | XXXXXX |
| YYYYMMDD | sender | XXXXXX |
| YYYYMMDD | sender | XXXXXX |

Fig. 7

211 — Job-F Scheduler Image

| | | | Day | | | | |
|---|---|---|---|---|---|---|---|
| | | | 100 Today | 101 | 102 | 103 | 104 |
| Hour | 1 | | | | | Meeting | |
| | 2 | | | Meeting | | | |
| | 3 | | | | | Meeting | |
| | 4 | | | | | | |
| | 5 | | Meeting | Meeting | | | |
| | 6 | | | | | Meeting | Meeting |
| | 7 | | Meeting | | | | |
| | 8 | | | | | | |
| Total Job-F Work Hour/Day | | 11.0 | | 3.00 | 3.00 | 1.00 | 3.00 | 1.00 |
| Job F not created from Job A to D | | 5.0 | | 1.00 | 2.00 | 0.00 | 1.00 | 1.00 |
| Job-F Listed item total | | 6.0 | | 2.00 | 1.00 | 1.00 | 2.00 | 0.00 |
| Job-A | 102 | 2.0 | 3 | 1.00 | 1.00 | | | |
| Job-B | 104 | 3.0 | 3 | | | 1.00 | 2.00 | |
| Job-C | 100 | 1.0 | 1 | 1.00 | | | | |
| Job-D | 101 | 0.0 | 1 | | | | | |

Job-V schedule and Total Work load

| | Due Date | J-Time by Hour | S-Days | Day | | | | |
|---|---|---|---|---|---|---|---|---|
| | | | | 100 Today | 101 | 102 | 103 | 104 |
| Total Work Load/Day | | 25.0 | | 5.00 | 6.00 | 4.00 | 5.00 | 5.00 |
| Total Job-F Work Hour/Day | | 11.0 | | 3.00 | 3.00 | 1.00 | 3.00 | 1.00 |
| Job-V List | | 14.0 | | 2.00 | 3.00 | 3.00 | 2.00 | 4.00 |
| Job-A | 102 | 4.0 | 3 | 1.00 | 1.00 | 2.00 | | |
| Job-B | 104 | 7.0 | 3 | | | 1.00 | 2.00 | 4.00 |
| Job-C | 100 | 1.0 | 1 | 1.00 | | | | |
| Job-D | 101 | 2.0 | 1 | | 2.00 | | | |

Fig. 10

Job-V schedule and Total Work load
In case of get 10H Job-E at due date 103 and select S-Days=1

|  | Due Date | J-Time by Hour | S-Days | Day 100 Today | 101 | 102 | 103 Due | 104 |
|---|---|---|---|---|---|---|---|---|
| Total Work Load/Day |  | 35.0 |  | 5.00 | 6.00 | 5.50 | 13.00 | 5.50 |
| Total Job-F Work Hour/Day |  | 11.0 |  | 3.00 | 3.00 | 1.00 | 3.00 | 1.00 |
| Job-V List |  | 24.0 |  | 2.00 | 3.00 | 4.50 | 10.00 | 4.50 |
| Job-A | 102 | 4.0 | 3 | 1.00 | 1.00 | 2.00 |  |  |
| Job-B | 104 | 7.0 | 3 |  |  | 2.50 | 0.00 | 4.50 |
| Job-C | 100 | 1.0 | 1 | 1.00 |  |  |  |  |
| Job-D | 101 | 2.0 | 1 |  | 2.00 |  |  |  |
| Job-E | 103 | 10.0 | 1 |  |  |  | 10.00 |  |

Chage Point

|  | Due Date | J-Time by Hour | S-Days | Day 100 Today | 101 | 102 | 103 Due | 104 |
|---|---|---|---|---|---|---|---|---|
| Total Work Load/Day |  | 10.0 |  |  |  | 1.50 | 8.00 | 0.50 |
| Total Job-F Work Hour/Day |  |  |  |  |  |  |  |  |
| Job-V List |  | 10.0 |  |  |  | 1.50 | 8.00 | 0.50 |
| Job-A | 102 |  | 3 |  |  |  |  |  |
| Job-B | 104 |  | 3 |  |  | 1.50 | -2.00 | 0.50 |
| Job-C | 100 |  | 1 |  |  |  |  |  |
| Job-D | 101 |  | 1 |  |  |  |  |  |
| Job-E | 103 | 10.0 | 1 |  |  |  | 10.00 |  |

Fig. 11

Job-V schedule and TotalWork load
In case of get 10H Job-E at due date 103 and select S-Days=2

|  | Due Date | J-Time by Hour | S-Days | Day | | | | |
|---|---|---|---|---|---|---|---|---|
|  |  |  |  | 100 Today | 101 | 102 | 103 Due | 104 |
| Total Work Load/Day |  | 35.0 |  | 6.50 | 6.50 | 7.33 | 7.34 | 7.33 |
| Total Job-F Work Hour/Day |  | 11.0 |  | 3.00 | 3.00 | 1.00 | 3.00 | 1.00 |
| Job-V List |  | 24.0 |  | 3.50 | 3.50 | 6.33 | 4.34 | 6.33 |
| Job-A | 102 | 4.0 | 3 | 2.50 | 1.50 | 0.00 |  |  |
| Job-B | 104 | 7.0 | 3 |  |  | 0.00 | 0.67 | 6.33 |
| Job-C | 100 | 1.0 | 1 | 1.00 |  |  |  |  |
| Job-D | 101 | 2.0 | 1 |  | 2.00 |  |  |  |
| Job-E | 103 | 10.0 | 2 |  |  |  | 6.33 | 3.67 |

Chage Point

|  | Due Date | J-Time by Hour | S-Days | Day | | | | |
|---|---|---|---|---|---|---|---|---|
|  |  |  |  | 100 Today | 101 | 102 | 103 Due | 104 |
| Total Work Load/Day |  | 10.0 |  | 1.50 | 0.50 | 3.33 | 2.34 | 2.33 |
| Total Job-F Work Hour/Day |  |  |  |  |  |  |  |  |
| Job-V List |  | 10.0 |  | 1.50 | 0.50 | 3.33 | 2.34 | 2.33 |
| Job-A | 102 |  | 3 | 1.50 | 0.50 | -2.00 |  |  |
| Job-B | 104 |  | 3 |  |  | -1.00 | -1.33 | 2.33 |
| Job-C |  |  |  |  |  |  |  |  |
| Job-D | 100 |  | 1 |  |  |  |  |  |
| Job-E | 101 | 10.0 | 1 |  |  |  | 6.33 | 3.67 |

Job-V schedule and Total Work load
In case of get 10H Job-E at due date 103 and select S-Days=3

| | Due Date | J-Time by Hour | S-Days | Day | | | | |
|---|---|---|---|---|---|---|---|---|
| | | | | 100 Today | 101 | 102 | 103 Due | 104 |
| Total Work Load/Day | | 35.0 | | 7.00 | 7.00 | 7.00 | 7.00 | 7.00 |
| Total Job-F Work Hour/Day | | 11.0 | | 3.00 | 3.00 | 1.00 | 3.00 | 1.00 |
| Job-V List | | 24.0 | | 4.00 | 4.00 | 6.00 | 4.00 | 6.00 |
| Job-A | 102 | 4.0 | 3 | 3.00 | 1.00 | 0.00 | | |
| Job-B | 104 | 7.0 | 3 | | | 0.00 | 1.00 | 6.00 |
| Job-C | 100 | 1.0 | 1 | 1.00 | | | | |
| Job-D | 101 | 2.0 | 1 | | 2.00 | | | |
| Job-E | 103 | 10.0 | 3 | | 1.00 | 6.00 | 3.00 | |

Change Point

| | Due Date | J-Time by Hour | S-Days | Day | | | | |
|---|---|---|---|---|---|---|---|---|
| | | | | 100 Today | 101 | 102 | 103 Due | 104 |
| Total Work Load/Day | | 10.0 | | 2.00 | 1.00 | 3.00 | 2.00 | 2.00 |
| Total Job-F Work Hour/Day | | | | | | | | |
| Job-V List | | 10.0 | | 2.00 | 1.00 | 3.00 | 2.00 | 2.00 |
| Job-A | 102 | | 3 | 2.00 | | -2.00 | | |
| Job-B | 104 | | 3 | | | -1.00 | -1.00 | 2.00 |
| Job-C | 100 | | 1 | | | | | |
| Job-D | 101 | | 1 | | | | | |
| Job-E | 103 | 10.0 | 3 | | 1.00 | 6.00 | 3.00 | |

Future to Today Scheduling

| Job Name | Due | Start | S-Days | Days | | | | | | | | | | | | | |
|---|---|---|---|---|---|---|---|---|---|---|---|---|---|---|---|---|---|
| | | | | | | | To day | | | | | | Due | | | | |
| | | | | 101 | 102 | 103 | 104 | 105 | 106 | 107 | 108 | 109 | 110 | 111 | 112 | 113 | |
| MyJob-1 | 108 | 106 | 3 | | | | | | | | | | | | | | |
| MyJob-2 | 110 | 109 | 2 | | | | | | | | | | | | | | |
| MyJob-3 | 108 | 107 | 2 | | | | | | | | | | Critical path | | | | |
| MyJob-4 | 106 | 104 | 3 | | | | | | | | | | | | | | |

Today to Future Scheduling

| Job Name | ECD | ESD | S-Days | Days | | | | | | | | | | | | | |
|---|---|---|---|---|---|---|---|---|---|---|---|---|---|---|---|---|---|
| | | | | | | | To day | | | | | | Due | | | | |
| | | | | 101 | 102 | 103 | 104 | 105 | 106 | 107 | 108 | 109 | 110 | 111 | 112 | 113 | |
| MyJob-1 | 108 | 106 | 3 | | | | | | | | | | | | | | |
| MyJob-2 | 110 | 109 | 2 | | | | | | | | | | | | | | |
| MyJob-3 | 108 | 107 | 2 | | | | | | | | | | Critical path | | | | |
| MyJob-4 | 106 | 104 | 3 | | | | | | | | | | | | | | |

Future to Today Scheduling

| Job Name | Due | Start | S-Days | Days | | | | | | | | | | | | | |
|---|---|---|---|---|---|---|---|---|---|---|---|---|---|---|---|---|---|
| | | | | | | | To day | | | | | | Due | | | | |
| | | | | 101 | 102 | 103 | 104 | 105 | 106 | 107 | 108 | 109 | 110 | 111 | 112 | 113 | |
| MyJob-1 | 108 | 106 | 3 | | | | | | | | | | | | | | |
| MyJob-2 | 110 | 109 | 2 | | | | | | | | | | | | | | |
| MyJob-3 | 108 | 107 | 2 | | | | | | | | | | Critical path | | | | |
| MyJob-4 | 106 | 104 | 3 | | | | | | | | | | | | | | |

Today to Future Scheduling

| Job Name | ECD | ESD | S-Days | Days | | | | | | | | | | | | | |
|---|---|---|---|---|---|---|---|---|---|---|---|---|---|---|---|---|---|
| | | | | | | | To day | | | | | | Due | | | | |
| | | | | 101 | 102 | 103 | 104 | 105 | 106 | 107 | 108 | 109 | 110 | 111 | 112 | 113 | |
| MyJob-1 | 109 | 107 | 3 | | | | | | | | | | | | | | |
| MyJob-2 | 111 | 110 | 2 | | | | | | | | | | | | | | |
| MyJob-3 | 109 | 108 | 2 | | | | | | | | | | Critical path | | | | |
| MyJob-4 | 107 | 105 | 3 | | | | | | | | | | | | | | |

Fig. 14

InCase job is done in S-Days

| Days | ESD | ECD | J-Time | Actual Work | Accumurated Actual Work | Status |
|---|---|---|---|---|---|---|
| 100 | 101 | 103 | 10 | 0 | 0 | All Planned |
| 101 | 101 | 103 | 10 | 3 | 3 | All Planned |
| 102 | 102 | 103 | 7 | 3 | 6 | All Planned |
| 103 | 103 | 103 | 4 | 4 | 10 | Completed/Confirmed |
|  |  |  |  |  |  |  |
|  |  |  |  |  |  |  |

Fig. 15

InCase job is done less than S-Days

| Days | ESD | ECD | J-Time | Actual Work | Accumurated Actual Work | Status |
|---|---|---|---|---|---|---|
| 100 | 101 | 103 | 10 | 0 | 0 | All Planned |
| 101 | 101 | 103 | 10 | 3 | 3 | All Planned |
| 102 | 102 | 103 | 7 | 3 | 6 | Completed/Confirmed |
|  |  |  |  |  |  |  |
|  |  |  |  |  |  |  |
|  |  |  |  |  |  |  |

Fig. 16

InCase job exceed S-Days with remaing J-time

| Days | ESD | ECD | J-Time | Actual Work | Accumurated Actual Work | Status |
|---|---|---|---|---|---|---|
| 100 | 101 | 103 | 10 | 0 | 0 | All Planned |
| 101 | 101 | 103 | 10 | 3 | 3 | All Planned |
| 102 | 102 | 103 | 7 | 0 | 3 | All Planned |
| 103 | 103 | 103 | 7 | 0 | 3 | All Planned |
| 104 | 104 | 104 | 7 | 0 | 3 | Stacked |
| 105 | 105 | 105 | 7 | 0 | 3 | Stacked |

Fig. 17

InCase job exceed S-Days also exceed J-time

| Days | ESD | ECD | J-Time | Actual Work | Accumurated Actual Work | Status |
|---|---|---|---|---|---|---|
| 100 | 101 | 103 | 10 | 0 | 0 | A llP lanned |
| 101 | 101 | 103 | 10 | 5 | 5 | A llP lanned |
| 102 | 102 | 103 | 5 | 5 | 10 | A llP lanned |
| 103 | 103 | 103 | 1 | 2 | 12 | A llP lanned |
| 104 | 104 | 104 | 1 | 0 | 12 | Stacked |
| 105 | 105 | 105 | 1 | 0 | 12 | Stacked |

Fig. 18

Case-1

| | | | | | | | |
|---|---|---|---|---|---|---|---|
| | Days | 100 | 101 | 102 | 103 | 104 | 105 |
| Original Plan | Status | CAN Start | CAN Start | CAN Start | CAN Start | | |
| | S-Days | 3 | 3 | 3 | 3 | | |
| | J-Time Total Hour | 10 | 10 | 10 | 10 | | |
| | J-Time Assigned to Day Hr/D | 0 | 3 | 3 | 4 | | |
| | ESD | 101 | 101 | 101 | 101 | | |
| | ECD | 103 | 103 | 103 | 103 | | |
| Day end Actual | Status | CAN Start | CAN Start | CAN Start | Comp. /Cnfm | | |
| | S-Day remaining days | 3 | 2 | 1 | 0 | | |
| | S-Day used accumulated Days | 0 | 1 | 2 | 3 | | |
| | S-Day used Days | 0 | 1 | 1 | 1 | | |
| | J-Time Remain Hr | 10 | 7 | 4 | 0 | | |
| | J-Time Used Accumulated Hr | 0 | 3 | 6 | 10 | | |
| | J-Time Used/day Hr/D | 0 | 3 | 3 | 4 | | |
| | ESD | 101 | 101 | 101 | 101 | | |
| | ECD | 103 | 103 | 103 | 103 | | |
| Rescheduling Data | Today | 101 | 102 | 103 | 104 | | |
| | Status | CAN Start | CAN Start | CAN Start | Comp. /Cnfm | | |
| | S-Day remaining days | 3 | 2 | 1 | 0 | | |
| | J-Time Remain Hr | 0 | 1 | 2 | 3 | | |
| | ESD | 101 | 101 | 101 | 101 | | |
| | ECD | 103 | 103 | 103 | 103 | | |

Case-2

| | | | | | | | |
|---|---|---|---|---|---|---|---|
| | Days | 100 | 101 | 102 | 103 | 104 | 105 |
| Original Plan | Status | CAN Start | CAN Start | CAN Start | CAN Start | | |
| | S-Days | 3 | 3 | 3 | 3 | | |
| | J-Time Total Hour | 10 | 10 | 10 | 10 | | |
| | J-Time Assigned to Day Hr/D | 0 | 3 | 3 | 4 | | |
| | ESD | 101 | 101 | 101 | 101 | | |
| | ECD | 103 | 103 | 103 | 103 | | |
| Day end Actual | Status | CAN Start | CAN Start | Comp. /Cnfm | | | |
| | S-Day remaining days | 3 | 2 | 1 | | | |
| | S-Day used accumulated Days | 0 | 1 | 2 | | | |
| | S-Day used Days | 0 | 1 | 1 | | | |
| | J-Time Remain Hr | 10 | 7 | 4 | | | |
| | J-Time Used Accumulated Hr | 0 | 3 | 6 | | | |
| | J-Time Used/day Hr/D | 0 | 3 | 3 | | | |
| | ESD | 101 | 101 | 101 | | | |
| | ECD | 103 | 103 | 103 | | | |
| Rescheduling Data | Today | 101 | 102 | 103 | | | |
| | Status | CAN Start | CAN Start | Comp. /Cnfm | | | |
| | S-Day remaining days | 3 | 2 | 0 | | | |
| | J-Time Remain Hr | 10 | 7 | 0 | | | |
| | ESD | 101 | 101 | 101 | | | |
| | ECD | 103 | 103 | 103 | | | |

Fig. 19

Case-3

| | Days | 100 | 101 | 102 | 103 | 104 | 105 |
|---|---|---|---|---|---|---|---|
| Original Plan | Status | CAN Start | CAN Start | CAN Start | CAN Start | Stucked | Stucked |
| | S-Days | 3 | 3 | 3 | 3 | 4 | 5 |
| | J-Time Total Hour | 10 | 10 | 10 | 10 | 10 | 10 |
| | J-Time Assigned to Day Hr/D | 0 | 3 | 3 | 4 | 7 | 7 |
| | ESD | 101 | 101 | 101 | 101 | 101 | 101 |
| | ECD | 103 | 103 | 103 | 103 | 104 | 105 |
| Day end Actual | Status | CAN Start | CAN Start | CAN Start | Stucked | Stucked | Stucked |
| | S-Day remaining days | 3 | 2 | 1 | 0 | 0 | 0 |
| | S-Day used accumulated Days | 0 | 1 | 2 | 3 | 4 | 5 |
| | S-Day used Days | 0 | 1 | 1 | 1 | 1 | 1 |
| | J-Time Remain Hr | 10 | 7 | 7 | 7 | 7 | 7 |
| | J-Time Used Accumulated Hr | 0 | 3 | 3 | 3 | 3 | 3 |
| | J-Time Used/day Hr/D | 0 | 3 | 0 | 0 | 0 | 0 |
| | ESD | 101 | 101 | 101 | 101 | 101 | 101 |
| | ECD | 103 | 103 | 103 | 103 | 104 | 105 |
| Rescheduling Data | Today | 101 | 102 | 103 | 104 | 105 | 106 |
| | Status | CAN Start | CAN Start | CAN Start | Stucked | Stucked | Stucked |
| | S-Day remaining days | 3 | 2 | 1 | 1 | 1 | 1 |
| | J-Time Remain Hr | 10 | 7 | 7 | 7 | 7 | 7 |
| | ESD | 101 | 101 | 101 | 101 | 101 | 101 |
| | ECD | 103 | 103 | 103 | 104 | 105 | 106 |

Case-4

| | Days | 100 | 101 | 102 | 103 | 104 | 105 |
|---|---|---|---|---|---|---|---|
| Original Plan | Status | CAN Start | CAN Start | CAN Start | CAN Start | Stucked | Stucked |
| | S-Days | 3 | 3 | 3 | 3 | 4 | 5 |
| | J-Time Total Hour | 10 | 10 | 10 | 11 | 13 | 13 |
| | J-Time Assigned to Day Hr/D | 0 | 3 | 3 | 4 | 7 | 7 |
| | ESD | 101 | 101 | 101 | 101 | 101 | 101 |
| | ECD | 103 | 103 | 103 | 103 | 104 | 105 |
| Day end Actual | Status | CAN Start | CAN Start | CAN Start | Stucked | Stucked | Stucked |
| | S-Day remaining days | 3 | 2 | 1 | 0 | 0 | 0 |
| | S-Day used accumulated Days | 0 | 1 | 2 | 3 | 4 | 5 |
| | S-Day used Days | 0 | 1 | 1 | 1 | 1 | 1 |
| | J-Time Remain Hr | 10 | 5 | 0 | -1 | 1 | 1 |
| | J-Time Used Accumulated Hr | 0 | 5 | 10 | 12 | 12 | 12 |
| | J-Time Used/day Hr/D | 0 | 5 | 5 | 2 | 0 | 0 |
| | ESD | 101 | 101 | 101 | 101 | 101 | 101 |
| | ECD | 103 | 103 | 103 | 103 | 104 | 105 |
| Rescheduling Data | Today | 101 | 102 | 103 | 104 | 105 | 106 |
| | Status | CAN Start | CAN Start | CAN Start | Stucked | Stucked | Stucked |
| | S-Day remaining days | 3 | 2 | 1 | 1 | 1 | 1 |
| | J-Time Remain Hr | 10 | 5 | 1 | 1 | 1 | 1 |
| | ESD | 101 | 101 | 101 | 101 | 101 | 101 |
| | ECD | 103 | 103 | 103 | 104 | 105 | 106 |

Fig. 20

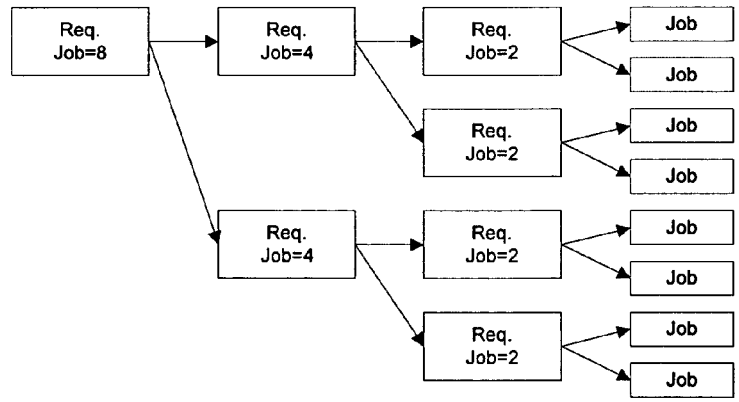

Fig. 21

| Job Name | ECD | ESD | S-Days | Estimated J-Time Job Hr | | Used Job Hr | | Days | | | | | | | | |
|---|---|---|---|---|---|---|---|---|---|---|---|---|---|---|---|---|
| | | | | All (A) | Crit (B) | All (C) | Crit (D) | 103 | 104 | 105 | 106 | Today 107 | 108 | 109 | Due 110 | 111 |
| Total | | | | 22 | 16 | 13 | 11 | | | | | | | | | |
| MyJob-1 | 108 | 106 | 3 | 6 | | 2 | | | | | | | | | | |
| MyJob-2 | 110 | 109 | 2 | 4 | 4 | 0 | 0 | | | | | | | | | |
| MyJob-3 | 108 | 107 | 2 | 4 | 4 | 3 | 3 | | | | | | | | | |
| MyJob-4 | 106 | 104 | 3 | 8 | 8 | 8 | 8 | | | | | | | | | |

| | a | b | c=b*8 | d=c/a |
|---|---|---|---|---|
| | Job Time | Scheduling days | | Scheduling |
| | Hour | Days | By Hour | Margin |
| Job-A | 4 | 2 | 16 | 400% |
| Job-B | 4 | 4 | 32 | 800% |
| Job-C | 4 | 6 | 48 | 1200% |

| Job Name | ECD | ESD | S-Days | J-Time | Days | | | | | | | |
|---|---|---|---|---|---|---|---|---|---|---|---|---|
| | | | | | | Today | | | | | Due | |
| | | | | | 103 | 104 | 105 | 106 | 107 | 108 | 109 | 110 | 111 |
| Total | | | | 16 | | | | | | | | |
| MyJob-2 | 110 | 109 | 2 | 4 | | | | | | | | |
| MyJob-3 | 108 | 107 | 2 | 4 | | | | | | | | |
| MyJob-4 | 106 | 104 | 3 | 8 | | | | | | | | |

| Due date | Req. Days | Prj Due -ECD | Need Cfm. | Un ReadM | Request Sender | Request Receiver | status | Request/Job |
|---|---|---|---|---|---|---|---|---|
| YY/MM/DD | X | X | X | X | XXXXXXX | XXXXXXX | Planed | |
| YY/MM/DD | X | X | X | X | XXXXXXX | XXXXXXX | Planed | |
| 03/11/30 | 22 | 0 | 0 | 0 | Me | Logistic Mgr. | Prj All Planed | |
| 03/11/30 | 22 | 0 | 0 | 0 | Logistic Mgr. | Logistic Spv. | Prj All Planed | |
| 03/11/30 | 2 | 0 | 0 | 0 | Logistic Spv. | Logistic Spv. | Prj All Planed | |
| 03/11/28 | 20 | 0 | 0 | 0 | Logistic Mgr. | Prd. Mgr. | Prj All Planed | |
| 03/11/28 | 20 | 0 | 0 | 0 | Prd. Mgr. | Prd. Spv. | Prj All Planed | |
| 03/11/28 | 10 | 0 | 1 | 0 | Prd. Spv. | Prd. Spv. | Completed | |
| 03/11/18 | 10 | 0 | 0 | 0 | Prd. Mgr. | Purchase Mgr. | Confirmed | |
| 03/11/18 | 10 | 0 | 0 | 0 | Purchase Mgr. | Purchase Sp. | Confirmed | |
| 03/11/18 | 1 | 0 | 0 | 0 | Purchase Sp. | Purchase Sp. | Confirmed | |
| 03/11/17 | 8 | 0 | 0 | 0 | Purchase Sp. | Purchase Sp. | Confirmed | |
| 03/11/09 | 1 | 0 | 0 | 0 | Purchase Sp. | Purchase Sp. | Confirmed | |
| YY/MM/DD | X | 0 | X | 0 | XXXXXXX | XXXXXXX | Planned | |

Fig. 38

PROJECT MANAGEMENT SYSTEM

FIELD

This invention relates to the field of systems for managing multiple projects with multiple tasks that incorporate participation from multiple individuals. More particularly, this invention relates to systems for program management planning and control.

BACKGROUND

A variety of different software programs have been developed to assist managers and others in creating plans and monitoring progress on multiple projects. Generally these software programs are characterized either as "groupware" or "project management software" software packages. The groupware that is currently available is typically a collection of email, "To Do Lists," and meeting planning tools with no core concept to organize these tools or make them cooperate with each other to accomplish a job. Current project management software is typically designed based on a project manager-centric concept, which means all authority for creating tasks, changing tasks, and so forth is controlled exclusively by the project manager.

However, for most jobs in the real world, it is very common that a departmental manager will develop an overall plan, and then assign some smaller part of the entire job to an assistant manager, and then the assistant manager will develop a detailed plan for just his assigned part of the job, and will conduct that part of the job. This means that most of the job is planned, organized, and coordinated by multiple participants, rather than all such work being accomplished by the departmental manager. For this reason, a project manager centric concept can not be adapted to most real-life jobs.

Thus, existing systems do not meet the needs of an environment where multiple projects within the organization are planned collaboratively.

What is needed, therefore, is an integrated system with organized tools to better plan and execute multiple projects by multiple participants.

SUMMARY

The above and other needs are met by a method for work planning, including establishing a work management system having a work data input system to record work planning information. The work management system has a data storage capacity for defining a plurality of requirements, a plurality of requests, and a plurality of job-tasks. The work management system also has a critical path method scheduling system, although in some embodiments a PERT or Program Evaluation and Review Technique is additionally or alternately available to calculate the schedule. The recording of work planning information is performed by requesters and receivers. A work initiator creates, receives, and accepts an original request, thereby establishing a highest-tier requirement having a requirement due date, start date, or both a due date and a start date, and thereby creating the highest-tier branch in a hierarchical work tree. The work management system enables the work initiator to become a requester.

The work data input system is used to initiate at least one request from a requester to at least one receiver. Each request supports at least one requirement and each request establishes a lower-tier requester's branch in the hierarchical work tree. Each request establishes a parent/child relationship between the supported requirements and the request, a pre/post time relationship between the supported requirements and the request, and a pre/post time relationship between each request supporting the same requirement. As used herein, the pre/post relationship is representative of time relations which are used in project management systems, like Start-Start, Start-Finish, Finish-Start, Finish-Finish.

The work data input system is used to enter a response from each receiver, where the response is selected from: (1) accepting the request and thereby become a participating receiver and also thereby causing the work management system to record the request as a requirement; and (2) rejecting the request thereby causing the work management system to record the request as refused, whereby the requester selectively uses the work data input system to modify the request.

The work data input system is used to enter a work plan approach from each participating receiver. The work plan approach is selected from: (1) creating at least one job-task to support at least one requirement, where each job-task establishes a job-task job-time, job-task scheduling-days, a parent/child relationship between the job-task and the requirements that the job-task was created to support, a pre/post time relationship between the job-task and the requirement the job-task was created to support, and each same-tier job-task establishes a pre/post time relationship between each job-task supporting the same requirement, whereby the participating receiver also becomes a performing receiver; and (2) creating a sub-tier request and thereby establish a new lower-tier branch in the hierarchical work tree, whereby the participating receiver also becomes a requester.

The work data input system is also used to create at least one job-task to support at least one requirement where each job-task establishes a job-task job-time, job-task scheduling-days, a parent/child relationship between the job-task and the requirements that the job-task was created to support, a pre/post time relationship between the job-task and the requirement the job-task was created to support, and each same-tier job-task establishes a pre/post time relationship between each job-task supporting the same requirement, whereby the participating receiver also becomes a performing receiver.

The critical path method scheduling system component of the work management system is used to construct a critical path schedule that includes a scheduled completion date for each job-task for the work, where the critical path schedule is constructed using: (1) the requirement due dates or start dates; (2) the job-task job-time and the job-time scheduling-days for each job-task; (3) the pre/post time relationship between each upper-tier requirement and each lower-tier requirement created to support the upper-tier requirement; (4) the pre/post time relationship between each job-task and the requirement the job-task was created to support; and (5) the pre/post time relationships between same-tier job-tasks and the requirements for which the same-tier job-tasks were created to support.

The work data input system is used to record job-task completion dates by each performing receiver and the work management system using the job-task completion dates to recalculate the critical path schedule. The critical path schedule component of the work management system and the parent/child relationship between each job-task and its associated requirement is used to develop a pictorial representation of all requirement due dates and completion dates, thereby displaying all job-task due dates and completion dates. The pictorial representation is viewed and the highest tier requirement is modified if needed.

According to another embodiment of the invention there is described a project management system having a memory for storing executable program modules, a processor for executing the program modules, an input for receiving user instructions as permitted by the program modules, a display for presenting information as directed by the program modules, and an interface for sending information to and receiving information from other computers. A power supply provides power to at least one of the memory, processor, input, display, and interface.

The program modules include a first module adapted to create a requirement as specified by a requestor. A second module receives an identity of a first receiver as specified by the requestor and automatically sends the requirement to the first receiver. A third module sends an acceptance of the requirement from the first receiver to the requestor as specified by the first receiver, and a fourth module sends a rejection of the requirement from the first receiver to the requestor as specified by the first receiver. A fifth module sends a notification of completion of the requirement from the first receiver to the requestor as specified by the first receiver. A sixth module partitions the requirement into a selectable number of sub requirements as specified by the first receiver. The first receiver is enabled to use the second module to send the selectable number of sub requirements to at least one second receiver. The at least one second receiver is enabled to use the third, fourth, and fifth modules to respond to the first receiver, and also to use the sixth module to further partition the sub requirements.

In a preferred embodiment, the first module is further adapted to associate a due date or start date with the requirement as specified by the requester, the second module is further adapted to send the due date or start date with the requirement to the first receiver, the third module is further adapted to selectively send a modification of the due date or start date from the first receiver to the requester, and the sixth module is further adapted to associate intermediary due dates or start dates with the sub requirements as specified by the first receiver.

BRIEF DESCRIPTION OF THE DRAWINGS

Further advantages of the invention are apparent by reference to the detailed description when considered in conjunction with the Figs., which are not to scale so as to more clearly show the details, wherein like reference numbers indicate like elements throughout the several views, and wherein:

FIG. 3 depicts a pull-down menu for controlling operations of a computer-based embodiment according to a preferred embodiment of the invention.

FIG. 4 depicts a screen for managing job requests and job requirements according to a preferred embodiment of the invention.

FIG. 5 depicts a screen for managing job-tasks according to a preferred embodiment of the invention.

FIG. 6 depicts the My_Job job-task portion of the main screen of FIG. 1 according to a preferred embodiment of the invention.

FIG. 7 depicts the Posted Memo portion of the main screen of FIG. 1 according to a preferred embodiment of the invention.

FIG. 10 depicts various job scheduling features according to a preferred embodiment of the invention.

FIG. 11 depicts further job scheduling features according to a preferred embodiment of the invention.

FIG. 12 depicts further job scheduling features according to a preferred embodiment of the invention.

FIG. 13 depicts further job scheduling features according to a preferred embodiment of the invention.

FIG. 14 depicts two-way job scheduling principles according to a preferred embodiment of the invention.

FIG. 15 depicts the effect of a job-task addition under one circumstance according to a preferred embodiment of the invention.

FIG. 16 depicts the effect of a job-task addition under a second circumstance according to a preferred embodiment of the invention.

FIG. 17 depicts the effect of a job-task addition under a third circumstance according to a preferred embodiment of the invention.

FIG. 18 depicts the effect of a job-task addition under a fourth circumstance according to a preferred embodiment of the invention.

FIG. 19 depicts two cases of job planning according to a preferred embodiment of the invention.

FIG. 20 depicts two additional cases of job planning according to a preferred embodiment of the invention.

FIG. 21 depicts the propagation of job-task stacking according to a preferred embodiment of the invention.

FIG. 38 depicts an example of an alternate graphical user interface according to an alternate embodiment of the invention.

DETAILED DESCRIPTION

Figure 1:
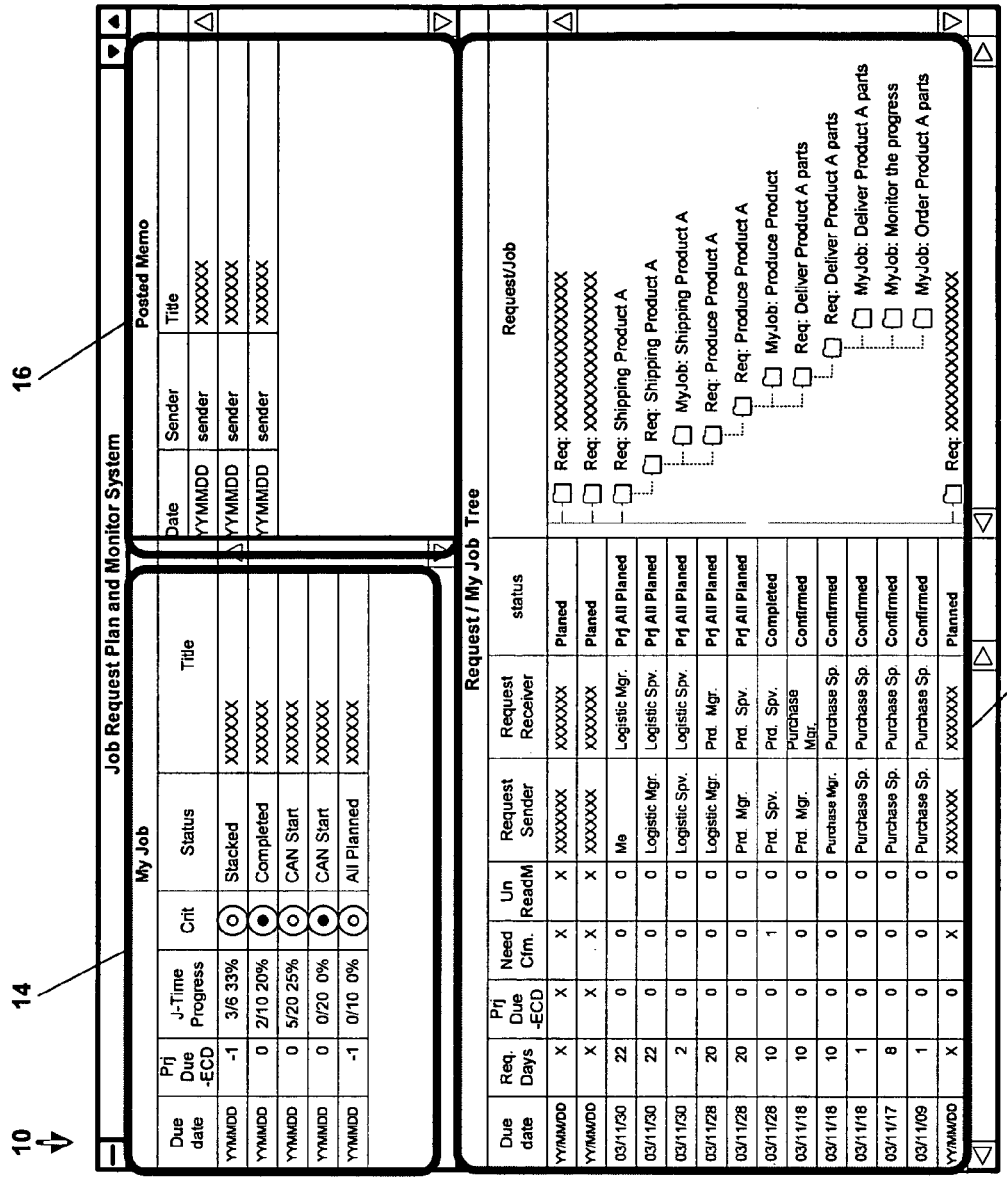
FIG. 1 depicts a main screen presented to a user in a computer-based system according to a preferred embodiment of the invention.

Various embodiments of a computerized system according to the present invention preferably implement a work management system with a work data input system to record work planning information. The work management system is preferably used to define requirements, make work requests, and define "My-Job job-tasks." Work is planned by both "requesters" and "receivers." Requesters preferably ask receivers to assume responsibility for certain work requirements using a work data input system. The receiver may either accept or reject responsibility for the work requirement. If the receiver accepts the responsibility, the receiver is preferably designated as a "participating receiver," and the request becomes a work requirement. Once the receiver accepts the responsibility, the receiver then preferably chooses to either personally perform the entire requirement, or delegate some or all of the responsibility to another party. If the receiver elects to delegate parts of the work, the receiver then preferably becomes a requester, who asks a next lower tier receiver to accept the delegation of work. In this manner a hierarchical tree of job-tasks is preferably created.

Most embodiments preferably include a critical path method scheduling process. The critical path method scheduler preferably predicts the duration of a given project by determining which sequence of activities within the project has the least amount of scheduling flexibility, or in other words, which sequence of activities is the "critical path." The earliest date that each job-task can be completed is preferably calculated by a forward pass through the sequence of tasks, starting from a start date. The latest date that each job-task can be completed is preferably determined by using a backward pass through the sequence of events, starting from a completion date. In preferred embodiments, the critical path method scheduler is enhanced by the use of a job-task that assigns each job-time to specific dates in the work calendar by considering workload balancing under the condition of multiple job-tasks.

In addition to or in place of the critical path method, a Program Evaluation and Review Technique (PERT) may be used. The PERT preferably includes preparation of a longest predicted duration, designated as the PD for pessimistic duration, the most possible duration designated as MPD, and the shortest predicted duration, designed as OD for optimistic duration. The standard duration is then calculated as (PD+6 MPD+OD)/6. The total schedule is then calculated by use the standard duration as given.

A reporting system in preferably included, which reporting system preferably provides information relating to the schedule for each job-task, job-task completion dates, and the overall progress of the work. As is described in more detail below, the reporting system preferably provides an estimated completion index, a ratio index, and a count index.

As previously introduced, work is preferably planned by requesters, who submit requests to receivers, and thereby solicit support from the receivers. However, to establish the first—or highest-tier—requirement, a work initiator preferably personally creates, receives, and accepts an original request. This highest-tier request becomes a requirement and has a requirement due date, and the requirement preferably creates the highest-tier branch in a hierarchical work tree. The work initiator is preferably able to establish a "My-Job job-request" to perform some of the work himself. In most embodiments, however, the initiator sends requests to other work team members, requesting their support to complete the requirement, which work team members then become receivers as described above. These receivers may in turn become requesters, thereby building the hierarchical work tree as previously outlined.

In the most preferred embodiments, the work management system is implemented as a computer-based system. FIG. 1 depicts a main screen 10 of the system according to a preferred embodiment of the invention, which screen 10 is preferably presented to a user in a computer-based embodiment of the invention. The main screen 10 preferably includes three sections:

1. A "Request/Job Tree" screen 12. This screen preferably depicts a chain of requests and final jobs, with a status code and other progress indices for the request.
2. A "My_Job" screen 14. This screen is preferably used to manage each person's job.
3. A "Posted Memo" 16. This screen is preferably used to view memos that may be posted in regard to requirements or My_Job.

Because different people receive and issue different requests and plan different jobs, the content of this screen 10 is preferably unique to each person who opens the screen 10. The general content of each section of the summary screen 10 is explained below in greater detail.

Figure 2:
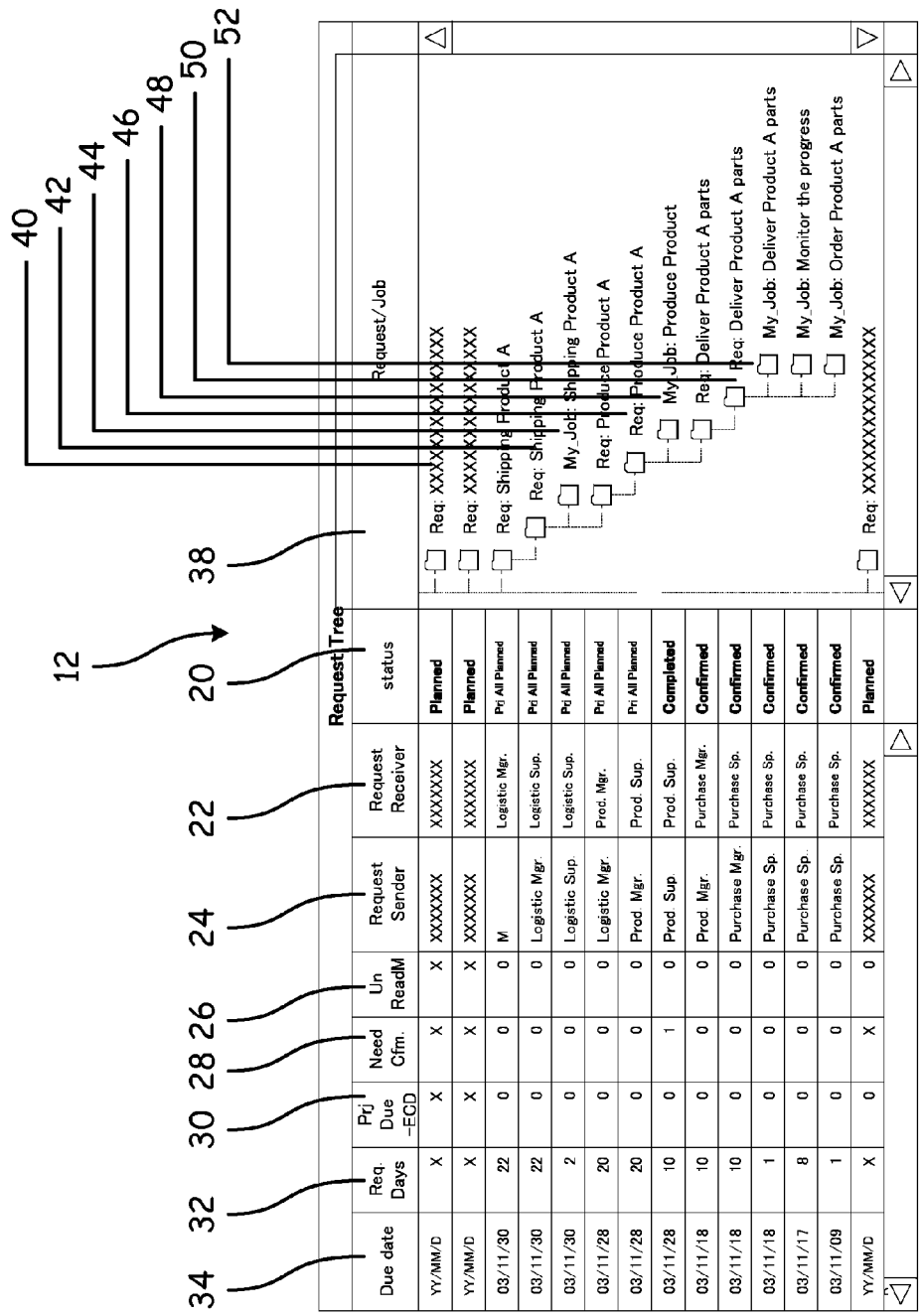
FIG. 2 depicts a Request/Job Tree Screen portion of the main screen of FIG. 1 according to a preferred embodiment of the invention.

FIG. 2 illustrates one embodiment of the Request/Job Tree screen 12 that is preferably used to manage requirements and jobs. The titles of the various requirements and My_Jobs are preferably displayed in a hierarchal tree configuration. This tree preferably depicts in a graphical format the relationship between a parent requirement and a child requirement, and between a parent requirement and a child My_Job job-task. The user can preferably drill down through various layers of the requirement, until the level of the terminal job is reached, or until the level of security limit is reached, and thus can preferably monitor the progress and status of each request for which the user has authority to view.

The Status column 20 preferably displays the planning and execution status of each of the requirements and job-tasks. The "Request Receiver" column 22 preferably identifies the person who received the requirement or the My_Job job-task, and the "Request Sender" column 24 preferably identifies the person who sent the requirement or the My_Job job-task. The "Unread Memo Count" column 26 preferably indicates the number of memos, most preferably in the form of email, in regard to each line that have not been opened and viewed by the recipient. The "Need Confirmation" column 28 preferably provides a count of requests which require confirmation of Completed Sub Requirement results. The "Project Due—ECD" column 30 preferably depicts a calculation of the Total Project Due Date—the Project Estimated Completion Date. The "Required Days" column 32 preferably depicts the number of days needed to accomplish each requirement or My_Job job-task. The "Due Date" column 34 preferably depicts the due date of each request or My_Job, as calculated from the original due date, each My_Job duration, and the pre/post relationship between the various My_Jobs, as determined by the critical path method system.

Figure 39:
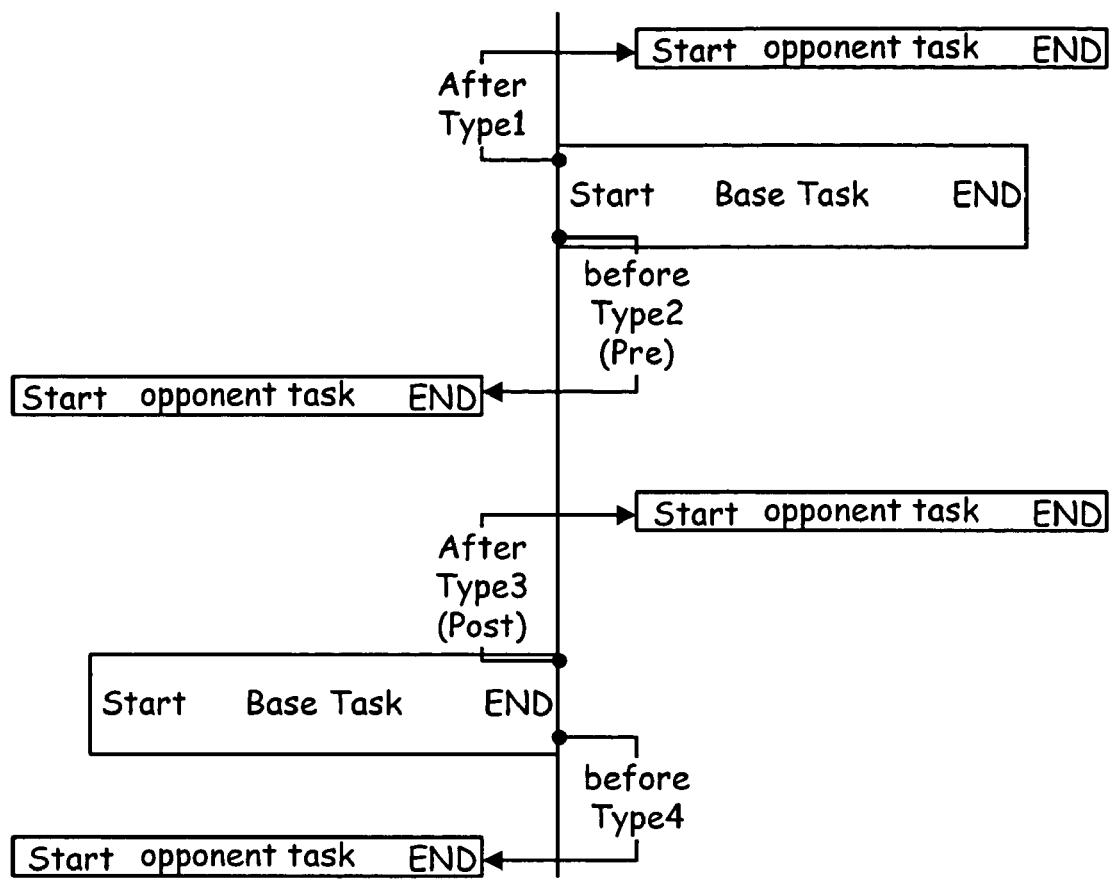
FIG. 39 depicts how several different types of time relationships are defined.

FIG. 39 depicts several different embodiments of time relationships as comprehended herein, and as are exemplified throughout this discussion as pre/post relationships. As depicted in the figure, there is a type 1 after relationship, where the start date of the target task is after the start date of the base task. The type 2 pre relationship is where the end date of the target task is before the start date of the base task. The type 3 post relationship is where the start date of the target task is after the end date of the base task. The type 4 before relationship is where the end date of the target task is before the end date of the base task. The default time relationship is preferably the type 4 before relationship.

The "Request/Job" zone 38 of FIG. 2 depicts the structure of the preferred hierarchical work tree in this embodiment. The highest tier 40 icons are preferably given at the left of the zone 38, with second tier 42 icons preferably branching from the highest tier 40 icons, and third tier 44 icons preferably branching from second tier 42 icons. The diagram preferably continues with fourth tier 46 icons, fifth tier 48 icons, sixth tier 50 icons, and seventh tier 52 icons shown in succession, as needed. It is noted that the highest tier 40 preferably consists only of requests/requirements, and most preferably the lowest tier, which is the seventh tier 52 in this example, consists only of My_Job job-tasks. All of the other tiers may preferably include both requests/requirements and My_Job job-tasks.

In various preferred embodiments, the work management system adds one or more of the following display filters to make this screen easier to use:
1. From a "request sent and received" stand point: (a) Top request which is received and sent by the user; (b) Top request which is received by the user; (c) Top request which is sent by the user; (d) Top request for which the user is designated as an observer; (e) Top request which is authorized by the user.
2. From a "request status" stand point: The request status="stacked," or so forth, as described in more detail below.
3. From a "request due date" stand point: The request is over due.

FIG. 3 illustrates some of the commands that are preferably available for adding or modifying information on the main screen 10 of the system. In various preferred embodiments, these commands are initiated such as from a pull-down menu. The "Create Sub Request" command 60 preferably creates a sub requirement from the selected requirement and sets the draft status to the newly created requirement. The "Create My_Job" command 62 preferably creates a My_Job job-task from the selected requirement. The "Add Memo" command 64 preferably adds a memo to the selected requirement.

The "Send Request" command 66 preferably sends a selected requirement, where the selected one preferably has a "draft" status. The "Delete Request" command 68 preferably deletes the selected requirement, where the selected one preferably has a "draft" status. The "Set Planned Status to the Requirement" command 70 preferably sets a planned status to the selected requirement, as described in more detail below. The "Set Completed Status to the Requirement" command 72 is preferably entered when a requirement is completed, and sets a completed status to the selected requirement.

The "Confirm the Completion of the Request" command 74 preferably enables the requirement sender to check the output of the requirement, and if the output meets the requirement sender's expectation, the requirement sender sets a confirmed status to the selected requirement. The "Refuse the Completion of Request" command 76 is preferably used by a request sender when the output does not meet the requirement sender's expectation, and to refuse a completion of the request, and sets a completion refused status to the selected request/requirement. The "Draft" command 78 preferably sets a draft status to the selected requirement. The "Open" command 80 preferably opens a request and sets the status to "Planning."

From the main screen (10) a request sender or receiver preferably issues a sub-job request, develops a concrete plan step by step, and monitors the progress of the job. FIG. 4 depicts an example of a job request/requirement screen 110, which is preferably viewed by opening one of the requirements. Parent Request row 112 preferably identifies the next higher tier requirement from which the present request/requirement originated. Req. Authorizer row 114 preferably identifies the party that authorized the present request/requirement. Req. Sender row 116 preferably identifies the requester, and Req. Receiver row 118 preferably identifies the receiver of the present request/requirement.

Observer row 120 preferably provides the identity of those parties that are authorized to monitor the requirement. Access Ctrl. row 122 preferably controls who is permitted to view the present requirement. Due date row 124 preferably defines whether the requirement due date is automatically calculated by the critical path method system, or explicitly locked to a fixed date. ESD/ECD of Req. row 126 preferably provides the estimated start date and the estimated completion date of the requirement. DUE-ECD of Prj. row 128 preferably depicts the calculated time between the due date of the present requirement and the estimated completion date of the project. Status row 130 preferably depicts the status of the request/requirement.

Progress of Req. row 132 preferably tracks the progress of the request/requirement. Title row 134 preferably depicts the title of the request/requirement. Body of Req. row 136 preferably provides a narrative description of the request/requirement. Child Req./My Job row 138 preferably depicts the child request/requirements and My_Job job-tasks that have been created for the requirement. Additional Post row 140 preferably displays email that has been posted in regard to the request/requirement. Accessible Board or Discussion Board row 142 preferably identifies resources available for the requirement. Meeting row 144 preferably depicts meetings that are planned for the request/requirement.

Table 1 illustrates the basic rules for requirements in the preferred embodiments.

TABLE 1

| | |
|---|---|
| 1 | Requirements - Basic Functions |
| | a Requirements have a title |
| | b Requirements have a body which shows the detail of the requirement |
| | c Requirements have one requirement sender |
| | d Requirements have one requirement receiver |
| | e Requirements have one or more Authorizers. Authorizers can be used when the requirement needs authorization from an authority greater than the sender, such as when the request requires some receiver-side resources, like service time money to accomplish the request. In such a case the request sender uses this function to add one or more Authorizer. |
| | f Requirements have one or more observers. An observer is a person who can see the requirement and is allowed to post memos to the requirement. |
| 2 | Requirements - Functions for relationship with other requirements and My_Jobs |
| | a Requirements have one or more upper stream requirement |
| | b Requirements allow just the requirement receiver to create one or more sub-requirements to accomplish the requirement |
| | c Requirements allow just the requirement receiver to create one or more My_Jobs to accomplish the requirement |
| | d Requirements can be set to a pre/post relationship with other requirements or My_Jobs |
| | e Requirement-A can not set the sub-requirement to the parent requirement, if the sub-requirement is the one created from Requirement-A. |

TABLE 1-continued

3   Requirements - Functions for scheduling
    a  Requirements have a manually set due date or automatically calculated due date.
    b  When a requirement does not have a manually set due date, the requirement due date is calculated from the My_Job duration and pre/post relationships with other requirements and My_Jobs by the critical path method.
    c  Top stream requirements preferably have a manually set due date.
    d  Requirements have an estimated job start date and an estimated job completion date.
4   Requirements - Functions for operation
    a  Requirements have a status to show their condition to the user.
    b  Requirements accept posted memos or posted meeting invitations to integrate all the jobs that are necessary to accomplish the requirement.
5   Requirements - Functions for security control
    a  Requirements can be set to prevent access from unauthorized users, from either a down stream or an up stream perspective, based on the contents of the requirement.

FIG. 5 is an example of a My_Job job-task screen 150, which is preferably viewed by opening one of the My_Jobs job-tasks. "Parent Req." row 152 preferably identifies the titles of parent requirements for the job-task. "Job Planner" row 154 preferably identifies the person who planned the job-task. "Observer" row 156 preferably identifies persons authorized to monitor the job-task. "Access Control" row 158 preferably establishes whether upper-tier requirements can view the job-task. "Due Date" row 160 preferably identifies the due date for job-task.

"ESD/ECD of Job" row 162 preferably identifies the estimated start date and the estimated completion date of the job-task. "DUE-ECD of Prj." row 164 preferably displays the calculated time between the due date of the job-task and the estimated completion date of the project. "J-Time/S-Days" row 166 preferably displays the job-time and the schedule-days for the job-task. These terms are more fully described elsewhere below. "Progress" row 168 preferably displays the progress-to-date on the job-task.

"Status" row 170 preferably displays the status of the job-task. "Title" row 172 preferably displays the title of the job-task. "Body of My_Job" row 174 preferably describes the detail requirement for the job-task. "Additional Post" row 176 preferably displays emails sent regarding the job-task. "Accessible Board or Discussion Board" row 178 preferably shows resources available for the job-task. "Meeting" row 180 preferably displays meetings scheduled for the job-task.

Table 2 provides the basic rules for My_Job job-tasks in the preferred embodiments.

TABLE 2

1   My_Job - Basic functions
    a  My_Jobs have a title.
    b  My_Jobs have a body which shows the detail of My_Job.
    c  My_Jobs have one requirement sender.
    d  My_Jobs have one requirement receiver.
    e  My_Jobs' receivers and senders must be the same person.
    f  My_Jobs have one or more observers, where an observer is a person who can see My_Job and is allowed to post memos to My_Job.
2   My_Job - Functions for relationships with other requirements and My_Jobs
    A  My_Jobs have one or more upper stream requirement.
    B  My_Jobs allow just the requirement receiver to create one or more My_Jobs to accomplish the requirement.
    C  My_Jobs can be set to a pre/post relationship with other requirements or My_Jobs.
    D  My_Jobs can not create child requirements or child My_Jobs.
3   My_Job - Functions for scheduling
    A  My_Jobs have a job time, which is the time required to complete the job.

TABLE 2-continued

B  My_Jobs have scheduling days, which are the days required in which to complete the job.
    C  My_Jobs' job time consists of "fixed day and time job" and "variable day and time job."
    D  My_Jobs' due date is calculated from My_Jobs' duration and the pre/post relationship with other requirements and My_Jobs by the critical path method.
    E  My_Jobs have estimated job start dates and estimated job completion dates.
4   My_Job - Functions for operation
    A  My_Jobs have a status to indicate their condition to the user.
    B  My_Jobs accept posted memos or posted meeting invitations to integrate all the jobs that are necessary to accomplish My_Job.

Table 3 provides a comparison between requirements and job-tasks.

TABLE 3

|  | Requirement | My_Job |
| --- | --- | --- |
| Creation of Sub Requirement | Can Do | Can Not Do |
| Creation of My_Job | Can Do | Can Not Do |
| Required things to do | Creation and supervising Sub-Requirement, Creation of My_Job | Execution of My_Job |
| Duration of accomplishment | Calculated from pre/post relation of My_Job and duration of My_Job created from the requirement | To be set by My_Job planner |
| Pre/Post relations with other requirements | Can Set | Can Set |
| Pre/Post relations with other My_Jobs | Can Set | Can Set |
| Multiple Parent Requirement | Can Set | Can Set |
| Job-Time | Do Not Have | Have |
| Scheduling days | Do Not Have | Have |

Table 4 summarizes the overall functional criteria for the preferred embodiments of the work management system.

TABLE 4

1   System functions to configure entire project
    a  Requirement trees must be terminated by My_Jobs.
2   System functions for scheduling
    a  The system allows My_Jobs' "Fixed day and time job" to be manually set by the person who is responsible person for. It is preferably used for meetings or business trips.
    b  The system discloses My_Jobs' "Fixed day and time job" to other people so as to hold another meeting not interfering with the other person's existing "Fixed day and time job."
    c  The system averages My_Jobs' "Any day and time job" so as to average the workload/day within the limitation of "Schedule days."
3   System functions for operation
    a  The system has a function to create a packed chain of requirements to handle large, complex projects and repeating daily routine jobs.
    b  The system has a function to support responsible person change to continue the project over the period of each person's assignment to the specific position.
4   System functions for security control
    a  The system controls access to each requirement and My_Job based on the access ban from up stream, down stream, and hierarchy within the tree of the requirements.

Table 5 summarizes the rules that are applied to job planning in the preferred embodiments.

TABLE 5

1  Each requirement has one requirement sender.
2  Each requirement has one requirement receiver.
4  Requirements have one or more upper stream requirements.
5  Only the requirement receiver can create one or more sub-requirements to accomplish the requirement.
6  Only the requirement receiver can create one or more My_Jobs to accomplish the requirement.
7  Each final branch of the requirement tree must be terminated by My_Job.
8  The sender and receiver of My_Job must be the same person, meaning that the owner of My_Job is the final responsible person for the job in the system user group.
9  Each requirement has a pre/post relation with other requirements or My_Job.
10  The total schedule is determined by the duration of My_Jobs and their pre/post relations to other My_Jobs.

The system allows requirements to have multiple parents, so there are down stream tree views and up stream tree views. If it is desired to see the entire project, then a user can move the view to the most up stream requirement which he is allowed to access, and from there he can view the entire requirement job tree in the downward direction.

FIG. 6 depicts an example of the My_Job screen 14 portion of the main screen 10. "Due Date" column 188 preferably shows the due date of My_Job. "Prj Due-ECD" column 190 preferably shows the calculated difference of the Project Due Date minus the Project Estimated Completion Date. This shows the current schedule situation for the project due date. If this value is negative, it means that the project can not be accomplished by the due date, and the receiver is expected to attempt to complete My_Job earlier than the due date so as to accelerate the progress of the project. Numbers in the "J-Time Progress" column 192 preferably have the following meaning. The first number (before the "/") is the time that has been used for this job as of a cut-off date. The second number (after the "/") represents the total job time planned. The percentage figure is the ratio of (Used time for this job since yesterday)/ (Total job time planned). "Crit." column 194 preferably indicates whether My_Job is on the critical path. "Status" column 196 preferably depicts the status of My_Job. "Title" column 198 preferably displays the title of My_Job.

FIG. 7 depicts an example of a posted memo screen 16 of the main screen 10. "Date" column 200 preferably depicts the date of the posting of the memo, which is preferably an email message, but might be some other type of memo. "Sender" column 202 preferably identifies the writer of the additional memo, and "Title" column 204 preferably displays the post title.

The posted memo screen 16 is preferably used like an email and meeting tool, with functionality similar to that as may be provided by other such tools, such as Microsoft Outlook, but with the following differences. The content of each memo is preferably posted to a targeted requirement or My_Job. The memo writer designates the people who are to receive notification of the post. When a person is designated to receive notification, he can see that notification on this screen and can see the content by opening the memo. Even if a person is not a designated recipient of the memo, he can view the memo if he has the security privilege to access the requirement or the My_Job. However, he preferably does not receive a posted notification unless he is so specified by the writer to receive the notification. If the designated recipient is a user of the system, and he has the security privilege to access the requirement or My_Job, he preferably receives notification on this screen 16. If the designated recipient is not a user of the system or he does not have the security privilege to access the requirement or My_Job, the memo is preferably translated to a standard email format and sent to the person at an identified destination, such as an email address. Once the memo is posted, preferably no user can change or delete the memo.

Figure 8:
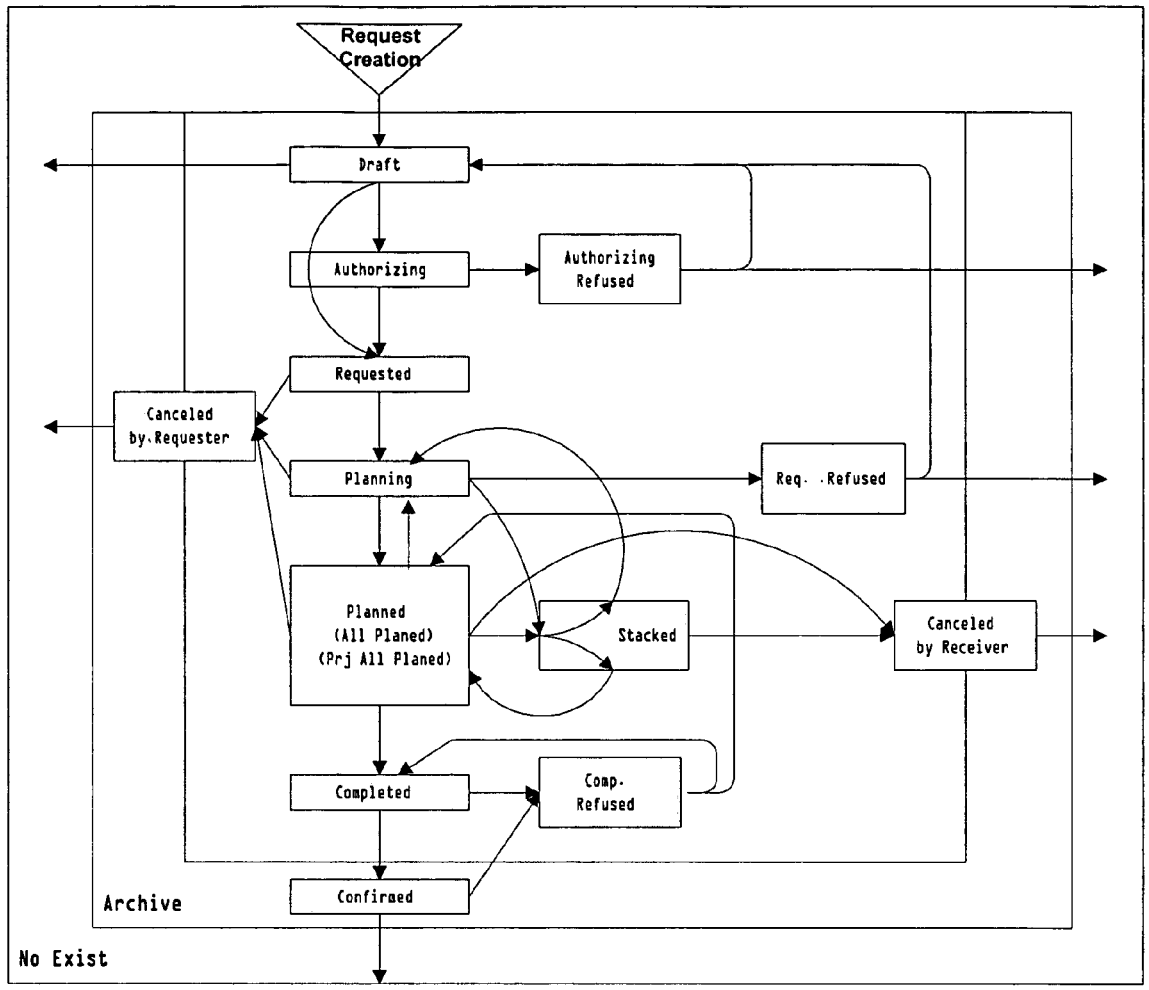
FIG. 8 depicts a logic flow diagram for the creation and management of requests in some embodiments of the invention.

FIG. 8 illustrates how the status of a requirement changes. Table 6 explains the meaning and relationship of the status blocks shown in FIG. 8.

TABLE 6

| Status | Meaning | Required Operation | To Go To Next Status |
|---|---|---|---|
| Non Exist | No requirement | Draft | Request sender pushes new request button. |
| Draft | The Requirement is a draft and not issued | Requested | Request sender completes draft and send request without authorizer. Then request is sent to request receiver. |
| | | Authorizing | Request sender completes draft and send request by indicating authorizer. Then request is sent to authorizer to review the properness of content of request. |
| | | Non Exist | Request sender deletes draft. |
| Authorizing | The Requirement is under review | Requested | When all indicated authorizers approve the request, Request is sent to request receiver and status is changed to requested. |
| | | Authorizing Refused | If one of the authorizers refuses to approve, status is changed to Authorizing Refused. |
| Requested | Request is created and issued to the request receiver | Planning | Request receiver opens the requirement. |
| | | Canceled | Request sender pushes cancel button of the requirement. |
| Planning | The Requirement is opened and under review | Planned | Request receiver issued all required sub requirements and My_Jobs to accomplish the requirement which he received, and pushes the planned button. This system requires at least one sub requirement or My_Job to change the status to planned. |
| | | Req. Refused | Request receiver judged that this requirement is difficult to accomplish or there is no need to accomplish and pushes Request Refuse button. |
| | | Canceled | Request sender pushes cancel button of the requirement. |
| | | Stacked | When the request or child sub request has a My_Job with a "Stacked" status. |
| Planned | The Request receiver created and issued all sub requirements and My_Jobs to accomplish the upper requirement | All Planned | "All Planned" is a special case of "Planned" status. Status displays "All Planned" when all direct sub requirements and My Jobs statuses change to "All Planned," the upper requirement status is automatically changed to "All planned." |
| | | Prj All Planned | "Prj All Planned" is a special case of the "Planned" status. Status displays "Prj All Planned" when the following conditions are met: |
| | | 1 | When the request becomes an "All Planned" and the requirement is an initial requirement, the status changes to "Prj All Planned." |
| | | 2 | When the parent requirement becomes "Prj All Planned," |

TABLE 6-continued

| Status | Meaning | Required Operation To Go To Next Status | |
|---|---|---|---|
| | | Completed | the child requirement also becomes "Prj All Planned." When all direct sub requirements change to "Confirmed" and My_Jobs change to "Completed," the upper requirement status is automatically changed to "Completed." |
| | | Planning | When one of the following events occurs, the requirement status is changed to "Planning:" |
| | | a. | Any direct sub requirement or My_Jobs status changes to "Canceled" or "Refused." |
| | | b. | The request sender adds a new sub-requirement. |
| | | Canceled | The request sender or receiver pushes the cancel button of the requirement. |
| | | Stacked | When the request or child sub request has a My_Job with a "Stacked" status |
| Planned | The Request receiver created and issued all sub requirements and My_Jobs to accomplish the upper requirement | Stacked | When the request or child sub request has a My_Job with a "Stacked" status |
| All Planned | A special case of the "planned" status that indicates that all sub requirements and My_Jobs which were created from this requirement have been planned | Same as "Planned" above. | |
| Prj All Planned | A special case of the "planned" status that indicates that the entire project has been planned | Same as "Planned" above. | |
| Stacked | Requirement is not completed with the scheduled days | Planning or Planned or All Planned or Prj All Planned | When a "Stacked" My_Job is properly re planned, its upper requirement changes status from "stacked" to the requirement status which existed at the time the state was stacked. |
| | | Canceled | The request sender or receiver pushes the cancel button of the requirement. |
| Completed | All direct sub requirements has been confirmed and My_Jobs status has changed to "Completed" | Confirmed | When the request sender confirms the output of the requirement and pushes the Confirmed button, the requirement's status changes to "Confirmed." |
| | | Comp. Refused | When the request sender reviews the output of the requirement and pushes the Refuse button, the requirement's status changes to "Completed Refused." |
| Authorizing Refused | Request failed to get authorization | Draft | The request sender pushes the "daft" button to modify the request to be accepted by the authorizer. |
| | | No Exist | The request sender gives up the request and pushes the "delete" button. |
| Comp. Refused | As a result of confirmation by the request sender, completion is refused | Completed | The request receiver pushes the Completed button again after modifying the output based on the requirement of the sender. |
| | | Planning | The request receiver creates a new requirement or new My_Job to modify the output based on the requirement of the sender. |
| Confirmed | Completion of the requirement is confirmed by the request sender | No Exist | After a determined period of time has passed. |
| Req. Refused | Request is refused by the request receiver | Draft | The request sender pushes the "daft" button to modify the request to be accepted by the request receiver. |
| | | No Exist | The request sender gives up the request and pushes the "delete" button. |
| Canceled | Requirement is canceled | No Exist | After a determined period of time has passed |

Table 7 lists the required actions by the request sender and receiver for each status depicted in FIG. 8.

TABLE 7

| | Request Sender | Request Receiver |
|---|---|---|
| Draft | Complete the request | |
| Requested | Check the items which have not changed status to "Planning" after an appropriate interval. | Open the request and read and understand what is requested |
| Planning | Check the items which have not changed status to "Planned" after an appropriate interval. | Develop sub requirements or My_Jobs to accomplish the request |
| Planned | Check the requirements which are not planned (set a higher priority for closer requirements). | Same as request sender. |
| All Planned | | If you have a My_Job, complete it, and then change the requirement status to "Completed." |
| Prj All Planned | if Due date - ECD is negative, then take action to reduce the lead time. | Same as request sender. |
| Stacked | Find out which item has exceeded the due date and take action to reschedule. | Complete the job or reschedule. |
| Completed | Confirm the output of the sub requirement. If the output meets your requirement, change the requirement status to "Confirmed." If the output does not meet your requirement, change the requirement status to "Completed Refused." | |
| Comp.- Refused | | Modify the output to be able to be accepted from the request sender, or issue a new requirement to the responsible person to modify the output. |

TABLE 7-continued

| Request Sender | Request Receiver |
|---|---|
| Confirmed | |
| Req. Refused | Give up the request or change the requirement status to draft and modify the requirement to be ale to be accepted by the receiver. |
| Cancel | |

Figure 9:
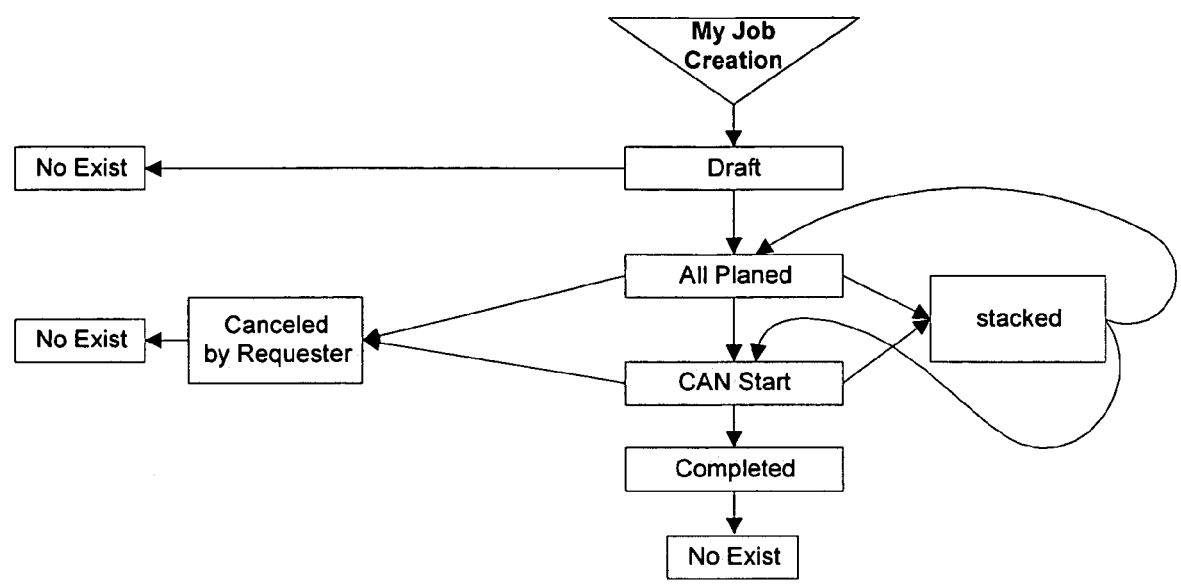
FIG. 9 depicts a logic flow diagram for creation and management of job-tasks in some embodiments of the invention.

FIG. 9 depicts how the status of My_Job changes. Table 8 explains the preferred meaning and relationship of each status depicted in FIG. 9.

TABLE 8

| Status | Meaning | | Required Operation to go to the next status |
|---|---|---|---|
| Non Exist | No My_Job | Draft | My_Job planner pushes new My_Job button. |
| Draft | My_Job is a draft and not issued | All Planned | My_Job Planner completes the draft and pushes the "All Planned" button. |
| | | Non Exist | My_Job Planner deletes My_Job |
| All Planned | My_Job has been planned and is waiting any pre My_Jobs to be Completed | CAN Start | When all pre My_Jobs have been completed and confirmed the My_Job status is changed to "CAN start." |
| | | Canceled | My_Job planner pushes the cancel button of My_Job. |
| CAN Start | Pre My_Jobs have been completed so you can start this My_Job | Completed | When My_Job is completed and My_Job planner pushes the Completed button. |
| | | Canceled | My_Job planner pushes the cancel button of My_Job. |
| | | Stacked | My_Job is not completed within the scheduled days and is waiting re-planning or to be completed. |
| Stacked | My_Job is not completed within the scheduled days | Completed | My_Job planner completes the job and pushes the completed button. |
| | | CAN Start | My_Job is re-planned and all pre My_Jobs have been Completed and confirmed. |
| | | All Planned | My_Job is re-planned and is waiting any pre My_Jobs to be Completed. |
| Completed | My_Job has been completed | No Exist | After a determined period of time has passed. |
| Canceled | My_Job is canceled | No Exist | After a determined period of time has passed. |

The preferred embodiments include a scheduling system. In the most preferred embodiments, a critical path method scheduling technique is used in part to determine each job's assigned date while maintaining the system concept of handling multiple jobs simultaneously, and also allowing freedom to all users for schedule planning and management. However, the critical path method has no mechanism to insure that the total schedule meets the due date. To overcome this, the system employs the following two features. A My_Job scheduling module is used to assign the job time for each My_Job to a specific day within the allowed period of days (scheduling days) by considering the workload balancing under the condition of multiple jobs. Then, a two-way scheduling module is used to calculate a project schedule backwards from the Due Date to Today, and forwards from Today to the Future. That is, the Due Date to Today process is used to create initial scheduling, and the Today to the Future scheduling is used to estimate actual start day and completion day for each requirement and My_Job. The system allows each person who receives a request to develop sub-requests and My-Jobs. The system preferably has two way scheduling to estimate the actual start day and completion day of each requirement and My_Job, in order take proper action for each request and My_Job receiver.

The My_Job scheduling module preferably incorporates the following principles. When observing daily jobs, two kinds of job time are preferably used: (1) "Job Time," which is the actual time required to complete a job, usually measured in hours, and (2) "Scheduling days," which is the period of time between deciding to complete a job and the due date of the job, usually measured in days. The reason that two kinds of time are preferably is that usually there are multiple jobs to perform, and each has a priority. Thus, even if there is only a four hour job to perform, usually it is not true that the job can be completed four hours later. Therefore, some number of days is assigned to a job, and multiple jobs can be arranged so as to be able to complete each job by its due date.

There are preferably two kinds of jobs: (1) Fixed Schedule Jobs, abbreviated as "Job-F", and (2) Variable Schedule Jobs, abbreviated as "Job-V". Meetings are one example of a fixed schedule job. The schedule of this job preferably cannot be changed without the agreement of co-workers. Co-workers may include people that are not employed by the same company or organization in which the system is deployed, such as customers or suppliers. Also, any job that must be done at a specific time is preferably considered, even if the job can be done alone as a fixed schedule job. One example of a Fixed Schedule Job for one person is a job to measure and record all room temperatures in a newly constructed hotel at 10 am, 12 am, 3 pm and 6 pm for a some period of days to test the capability of the climate control system. Variable Schedule Jobs are jobs which can be done alone whenever there is time to do them.

The system preferably uses the same concept to handle both new jobs and existing jobs. These two times are preferably designated as: (1) Job-Time, abbreviated "J-Time," and (2) Scheduling-Days, abbreviated "S-Days." Job-Time is the true time which is required to execute the job. Scheduling-Days is the time that is used for scheduling the job. Preferably, S-days is longer than J-Time. These time durations are preferably used to average the daily work load. If a longer S-Days is set, the daily workload can be averaged better, but a longer lead time is generally required to complete the job.

Jobs are preferably scheduled in the following manner. First, a job is scheduled between [Due Day minus Scheduling Days] and [Due Date]. Then, the total job hours are distributed during the period above to be able to average the total daily work load. Finally, the system preferably changes other job work hour assignments to average the total daily work load within each job's period of Scheduling Days and Due Date, and to keep the total project schedule.

FIG. 10 illustrates an example of how the system schedules My_Job, considering these four factors: J-time, S-days, Job-F, Job-V. Date Zone 1 211 preferably displays a calendar. Working hour/day Zone 2 212 preferably displays hours per day. Job Zone 3 213 preferably displays each fixed schedule My_Jobs created by scheduling a meeting. When a user schedules a meeting for some job, it preferably automatically becomes a fixed schedule My_Job for all related persons. Job Zone 4 214 preferably displays fixed scheduled events that are produced by the system (such as "attend meeting," which is not created based on a requirement). Job Zone 5 215 preferably displays the total work load of fixed schedule jobs. Job Zone 6 216 preferably displays variable schedule My_Jobs. Originally, all J-Time is preferably assumed as variable scheduled time. This is the assignment time that the system can change within the limitation of the Scheduling Days to average the daily total work load. Job Zone 7 217 is preferably a copy of the total work load of fixed schedule jobs. Job Zone 8 217 preferably displays the total work load/day.

To further explain how the system works, an example is given for the addition of ten hours of JOB-E, with a due date 103. Three cases are examined: (1) Scheduling Days=1; (2) Scheduling Days=2; and (3) Scheduling Days=3. FIG. 11 illustrates the Job-V schedule where Job-E is added with S-days=1. In Block 1 221, ten Hours of Job-E is added. In Block 2 222, ten hours of Job-E is scheduled on day 103 because S-days=1. In Block 3 223, Job-B's two hour job assignment on day 103 is removed and assigned to day 102 and 104, as seen in comparison to FIG. 10, to average the work load.

FIG. 12 illustrates the Job-V schedule when Job-E is added with S-days=2. In Block 1 231, ten Hours of Job-E is added. In Block 2 232, ten hours of Job-E is scheduled between days 103 and 102, because S-days=2. In Block 3 233, Job-B's job assignment on day 102 and 103 is reduced by a total of 2.33 hours and distributed to day 104 to average the work load. In Block 4 234, Job-A's job assignment on day 102 is reduced two hours and distributed to days 100 and 101 to average the work load.

FIG. 13 table shows the Job-V schedule when Job-E is added with S-days=3. In Block 1 241, ten Hours of Job-E is added. In Block 2 242, ten hours of Job-E is scheduled across days 101, 102, and 103, because S-days=3. In Block 3 243, Job-B's job assignment on days 102 and 103 is reduced a total of two hours and distributed to day 104 to average the work load. In Block 4 244, Job-A's job assignment on day 102 is reduced two hours and distributed to day 100 to average the work load.

In addition to job scheduling, in preferred embodiments the system uses two methods of scheduling. The first method is called Due Date to the Past. This scheduling method starts from the job Due Date and schedules backwards in time toward today. When the lead time is longer than the time period back to today, this method will preferably continue to schedule into the past. The second method is called Today to the Future. This scheduling method is preferably finds the critical path first, and then works in two different ways, depending on the earliest job start day. If the Earliest job start day is greater than Today, the earliest start day is set to the date which was calculated by the Due Date to the Past scheduling method, and calculates a schedule by going forward in time. If the Earliest job start day is less than Today, today is calculated as the earliest start day, and the day count is added to each job start day and due date. Basically, this operation creates a plan when a project must be started today.

FIG. 14 illustrates the two-way scheduling system, where the acronym ECD stands for the Estimated Completion Date of the task, and ESD stands for the Estimated Start Date of the task. FIG. 14 depicts an example where the Earliest job start day is greater than Today, so both diagrams show the same schedule. FIG. 14 also depicts the same project but simulates the case when this project is assigned at day 105, and shows how the Today to Future scheduling method works when the Earliest job start day is less than Today. In this case, Today minus Earliest start day of the project is 105−104=1, so one day is added to both the Due Date and Start Date of Jobs 1, 2, and 3. This one day shifted schedule is input into the Today to Future method, and generates a schedule based on Start Date=today.

The ESD and ECD columns as depicted in FIG. 15 preferably depict each job's estimated start and completion date. Each requirement preferably has a Due Date that is calculated from the Due Date given by the upper requirement, but ECD and ESD are preferably calculated to complete the entire project. When the Today to Future schedule is calculated, the uppermost requirement which has a Due Date manually set is preferably moved back.

Another important feature included in the preferred embodiments of the present invention is progress reporting and rescheduling. Even when a good plan is developed, it is possible that the project cannot be completed before the Due Date, because of a delay in one or more of the jobs. This section explains how to reflect the daily progress of the job, and how to reschedule the project based on the progress data. In the case illustrated in FIG. 15, the job is finished on the due date (the system detects the finish of the job by the user pushing a completion button), the system changes the status of the job to completed, and sends a completion notification to the requester. In the case illustrated in FIG. 16, the job is finished before the due date, and the system reacts the same way as in FIG. 15.

In the case where the job is not finished on the due date and J-Time remains, as illustrated in FIG. 17, the system changes the jobs status to "Stacked" and changes the upper requirement status to "Stacked." Also, the system preferably automatically extends one S-day for the remaining J-Time. It is noted that the added one S-day is just a pre-defined value of the system, and has other values in other embodiments. In the stacked condition, the system is constrained with insufficient S-Days to complete this job.

In the case where the job is not finished on the due date and J-Time is over, as illustrated in FIG. 18, the system preferably changes the jobs status to "Stacked," and changes the upper requirement status to "Stacked." Also, the system preferably automatically extends one S-day and one hour of J-Time. It is again noted that the added one S-day and one hour of J-time is merely a pre-defined value of the system, and can have different values in different embodiments. In the stacked condition, the system is constrained with insufficient S-Days and J-Time to complete this job.

A status of "Stacked" means that the job was not completed by the scheduled date and the system has not been rescheduled. The preferred required action for the My_Job's responsible person is to reschedule the job. In addition, the upper request sender might be required to arrange jobs, such as sharing one of the job parts with another person, in order to complete the job. FIGS. 19 and 20 illustrate further details of the scheduling system.

Figures 22, 23:
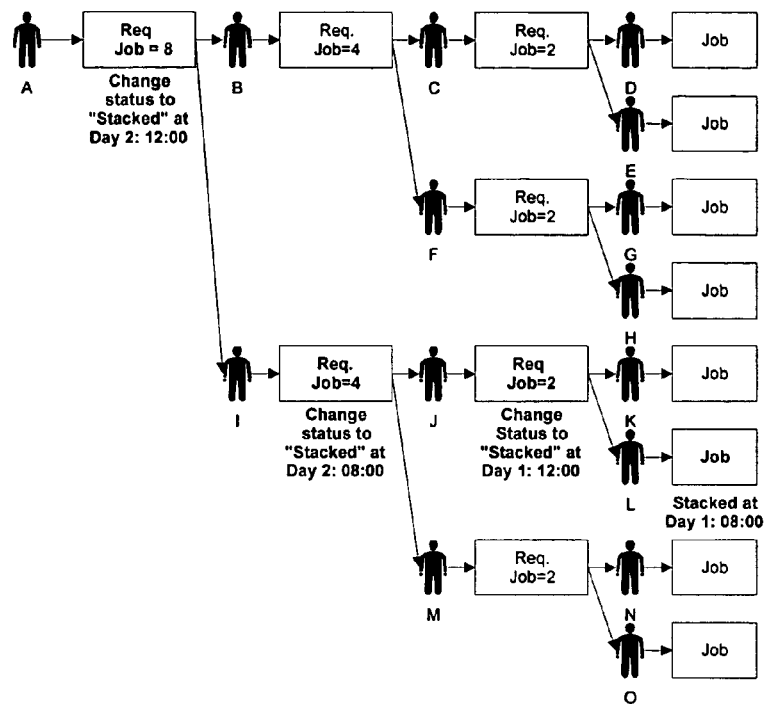
FIG. 22 depicts the effects of a delay of propagation of job-task stacking according to a preferred embodiment of the invention.
FIG. 23 depicts a sample set of job-task parameters according to a preferred embodiment of the invention.

In the preferred embodiments, when a job is stacked, a notice of that condition is preferably provided to the higher-tier requirement requesters. However, if the system were to transfer the "Stacked" status to the upper request without any delay whatsoever, then the upper request's status would tend to reflect the "Stacked" status far too frequently. FIG. 21 depicts how many final My-jobs are created from each requirement, and how higher requirements have a tendency to have a status of "stacked" too frequently. So, in the most preferred embodiments it is possible to delay such status notice to the upper request for some period of time, such as for four hours or one day. FIG. 22 shows the delay of the "Stacked" status change, as summarized in Table 9.

TABLE 9

| Level | Person Code | Status Change Date/Time | Delay |
|---|---|---|---|
| 0 | L | Day-1 08:00 | 0 working hours |
| 1 | J | Day-1 12:00 | 4 working hours |

TABLE 9-continued

| Level | Person Code | Status Change Date/Time | Delay |
|---|---|---|---|
| 2 | I | Day-1 17:00 or Day 2 08:00 | 8 working hours |
| 3 | A | Day-2 12:00 | 12 working hours |

This delayed notification has the following two benefits. First, it preferably prevents too much "Stacked" information from being transferred to the upper requester. Second, it preferably creates time for the middle management to react to the problem.

In the most preferred embodiments, the system provides progress index information. Table 10 summarizes examples of these indices.

TABLE 10

| 1 | ECD or Due-ECD Index | ECD depicts the Estimated Completion Date of the requirement and Due-ECD depicts how many days early or delayed the project is estimated to finish. |
|---|---|---|
| 2 | Used Job Hour Index | This index indicates how many job hours are used in all My_Jobs under the requirement. When compared to all estimated My_Job hours, this index displays the ratio of used time versus estimated time. |
| 3 | Used Job Hour Critical Path Index | This index displays how many critical path job hours have been used under each requirement. When compared to all estimated critical path job hours, this index displays the ratio of used time versus estimated time. |
| 4 | Conservative Used Job Hour Index | This index provides the smaller of the Used Job Hour Index and the Used Job Hour Critical Path Index. |
| 5 | Planned and Executed Item Index | This index provides the progress of the plan and execution from the view point of each job and requirement count. |
| 6 | Passed Dates Index | This Index provides the count of days that have passed since the requirement was received. This is preferably used to see the passed days in the early stage of a project. |
| 7 | Remaining dates Index | This Index provides the count of Today's Date minus Due Date of the requirement. This is preferably used to see the remaining days in the terminal stage of a project. |

In the ECD or Due minus ECD Index, ECD shows the Estimated Completion Date of the requirement and Due-ECD shows how many days early or delayed the project is estimated to finish.

FIG. 23 illustrates the Used Job Hour Ratio Index. The chart preferably depicts all the jobs that have been created from one source requirement. The Used Job Hour Ratio Index preferably depicts how much time is has been used to realize the requirement, and also the ratio for the total estimated time, which shows what percentage of the estimated job hours have been used for this requirement. In the example depicted, the Used Job Hour Ratio Index=column C divided by column A=13/22=59.1%. Similarly, the Used Job Hour Ratio Critical Path Index for a Requirement is preferably calculated as column D divided by column B=11/16=68.8%

The Conservative Used Job Ratio Index for a Requirement preferably indicates the smaller value of the Used Job Hour Ratio Index and the Used Job Hour Ratio Critical Path Index. There are typically two cases which create a delay in the progress of a project. First, the critical path job is on schedule, but the non critical path job is not done as planned; and second, the non critical path job is on schedule, but the critical path job is not done as planned. In the example above, the Used Job Hour Ratio Index of 59.1% is smaller than the Used Job Hour Ratio Critical Path Index of 68.8%, so the Conservative Used Job Ratio Index=59.1%

Figure 24:
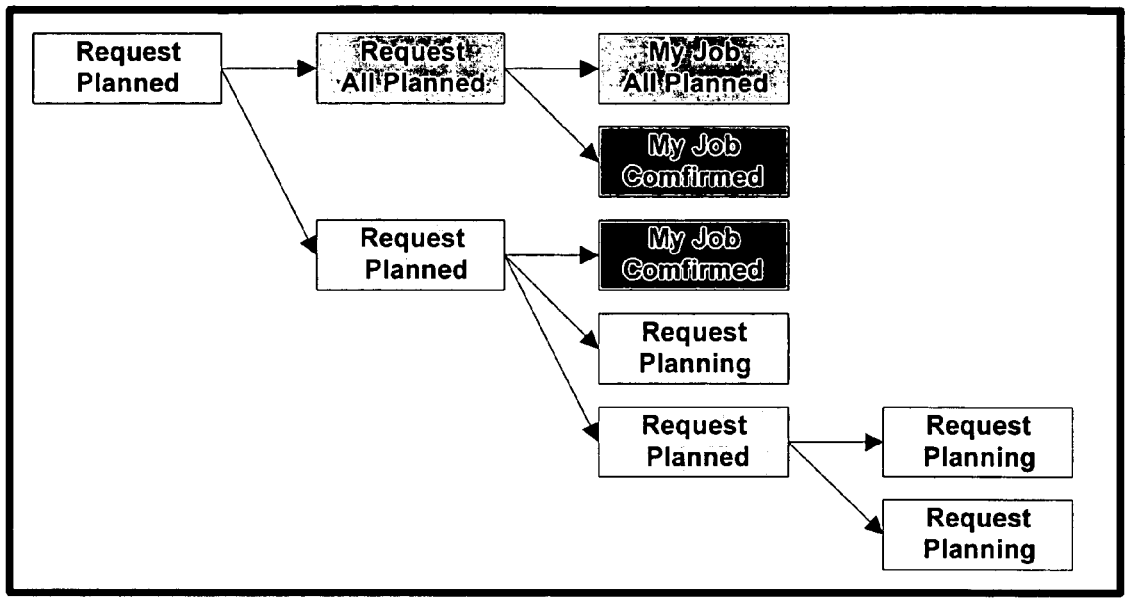
FIG. 24 depicts a sequence of request status logic according to a preferred embodiment of the invention.
Figure 25:
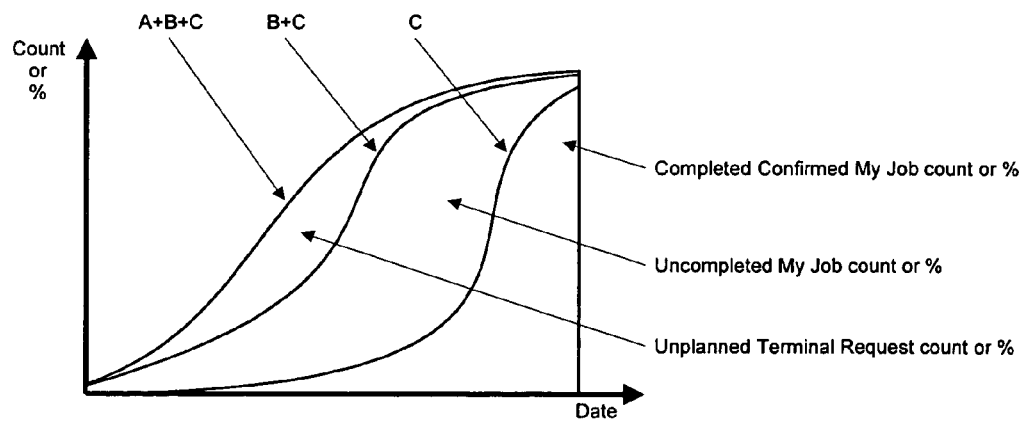
FIG. 25 depicts a graphical presentation of a progress reporting index according to a preferred embodiment of the invention.
Figures 26, 27, 28:
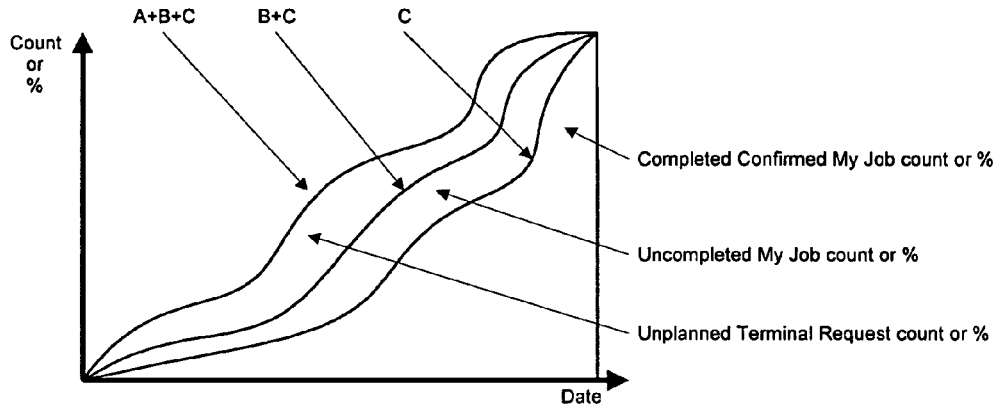
FIG. 26 depicts a graphical presentation of a progress reporting index based upon alternate data according to a preferred embodiment of the invention.
FIG. 27 depicts numerical data associated with a progress index according to a preferred embodiment of the invention.
FIG. 28 depicts a critical path schedule according to a preferred embodiment of the invention.

FIG. 24 illustrates the information that is used to calculate the Planned and Executed Item Index. Referring to FIG. 25, the following values are preferably identified: "A"=Terminal Requirement Count Status (Requested or Planning)=3; "B"=My Job Count Status (All Planned or CAN Start or Completed)=1; and "C"=My Job Count Status (Confirmed)=2. Using these values we can create the following index:
1. A Planned Item Index. This index preferably indicates the progress of planning, and is defined as (B+C)/(A+B+C). For the values given in FIG. 25, that calculates as 3/6 or 50%.
2. An Execution Item Index. This index preferably indicates the progress of execution, and is defined as C/(A+B+C). For the values given in FIG. 25, that calculates as 2/6 or 33%.
3. By counting A, B, and C and recording these numbers once each day, the following graph is created and can be used to help understand how much has been planned for the requirement and how much has been executed for the requirement. FIG. 25 illustrates an example of a graphical representation of project history represented by these data. This historical view helps to judge the quality of the project. The pattern of FIG. 25 indicates that the entire project cannot be planned at the beginning. The plan count grows as the project is conducted. The pattern shown in FIG. 26 is typical of a trial and error project.

Continuing with the examples of the progress indices, a Passed Dates Index is preferably used to indicate the count of days that have passed since the requirement was received. This is preferably used to see the passed days in the early stage of a project. A Remaining Dates Index indicates Today's Date minus the Due Date of requirement. This is preferably used to see the days remaining in the terminal stage of a project.

A Job and Project Margin Index preferably indicates how much margin exists for each job and the entire project. The Job Margin Index is calculated as following. Job Margin=remaining scheduling days count*8 Hr/remaining Job time. FIG. 27 presents sample calculations. The Margin Index preferably compares the remaining time to complete a job to the remaining time until the job due date. High execution priorities are preferably set to jobs which have less margin. A Project Margin Index indicates how much time remains to complete the project. FIG. 28 presents sample data for these calculations. Job Margin Index=remaining days count to due date*8 Hr/All remaining Job time=7 days*8 hr/16 Hr=56 Hr/16 Hr=350%. This margin preferably compares the remaining critical path requirement time for the project to the remaining hours until the project due date. A high execution priority is preferably set for projects which have less margin.

The Planned Item Index, the Execution Item Index, the Passed Dates Index, and the Remaining Dates Index are examples of counting indices. The Used Job Hour Index, the Used Job Hour Critical Path Index, and the Conservative Used Job Hour Index are examples of ratio indices.

The purpose of the Job Requesting, Planning, and Execution Monitoring System as described herein is preferably to support work management processes. This is a common control measure which is typically accomplished as a manual management activity. The system does not conduct these jobs completely automatically, but can supply data to support the adjustments depicted in Table 9.

TABLE 11

| Adjustment | Content | Supporting data |
|---|---|---|
| Ask to shrink | Ask related person to shrink S-days | ECD or Due date-ECD. Ask to shrink S-days. |

TABLE 11-continued

| Adjustment | Content | Supporting data |
|---|---|---|
| Change job relation | Change serial job to parallel job if it allows for such. | Show job diagram. |
| Request to shorten S-Days | Request to shorten a specific Job, by shortening an S-days for the job belonging to critical path. The owner of the job will lose the flexibility to average the work load. | 1 List jobs which belong to the critical path, and order by (job hours/ (current S-day-1)) to determine the minimum effect of shrinking one day. 2 List the work load for the person responsible for the critical path job. |
| Change Job Assignment | Change job assignment from a busy person to a person who isn't. | Work load of each person. |
| Delay other project | Discover resource-competing job and unimportant project and delay that due date. | Project list. |
| Delay Due date of the project | Delay due date. | Nothing. |

The present system is preferable designed for top down planning and bottom up scheduling. The data that issues from the upper request is a due date, and all other schedules are preferably calculated from the duration of each job and the pre/post relationships between the jobs. Some might believe that if there are no forceful functions, such as "Do this requirement within two days," or "Prevent the receiver from making a plan that overwrites this order," that the project targets cannot be achieved. However, work performance tends to more heavily depend on the following factors:
1. The reliability of the people who carry out the jobs tends to be a larger factor than the schedule that is dictated for the jobs. Thus, even if the system has a function to force an upper management pre-determined schedule, it does not insure the success of the project.
2. Proper project architecture.
3. Job requirements sent to the proper person.
4. Adequate time scheduled to do the job.
5. Proper resources, such as information, support members, and budget, allocated for the job.
6. Proper job preparation.

These factors are all developed by the people who use the system. Thus, a project management system does not insure the success of the project, but instead provides information to support the users of the system.

In the preferred embodiments, the system provides for control of project security, based at least in part on the requirement tree, which includes an identification of all people related to the project, including requirement senders, receivers, authorizers, and observers. Up-stream requirement visibility and down-stream requirement visibility provides access to information. Up-stream requirement visibility provides overview or total project information to the lower job responsible person. Down-stream requirement visibility provides project progress information to the request sender.

Figure 29:
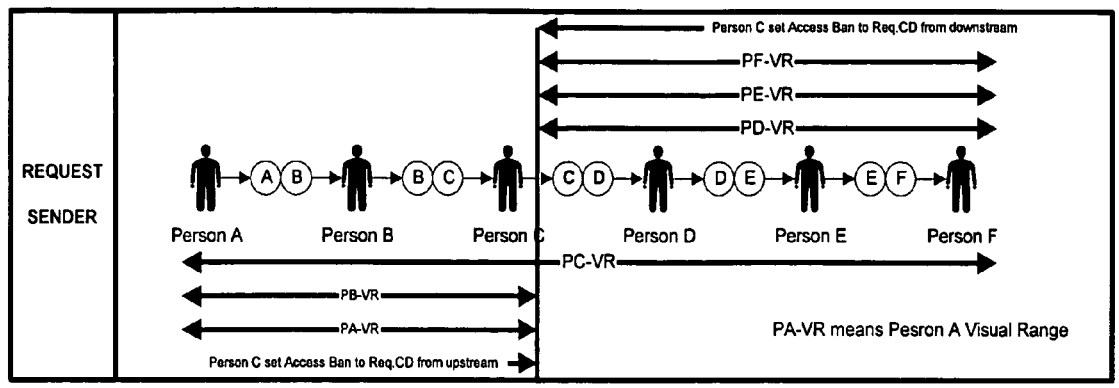
FIG. 29 depicts a report viewing constraint technique according to a preferred embodiment of the invention.
Figure 30:
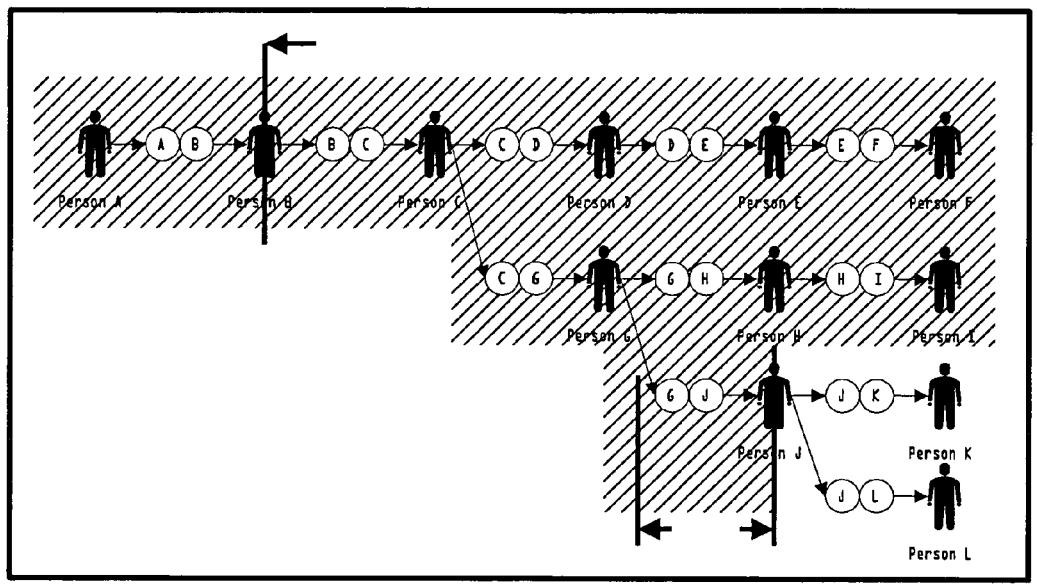
FIG. 30 depicts a further example of a report viewing constraint technique according to a preferred embodiment of the invention.
Figure 31:
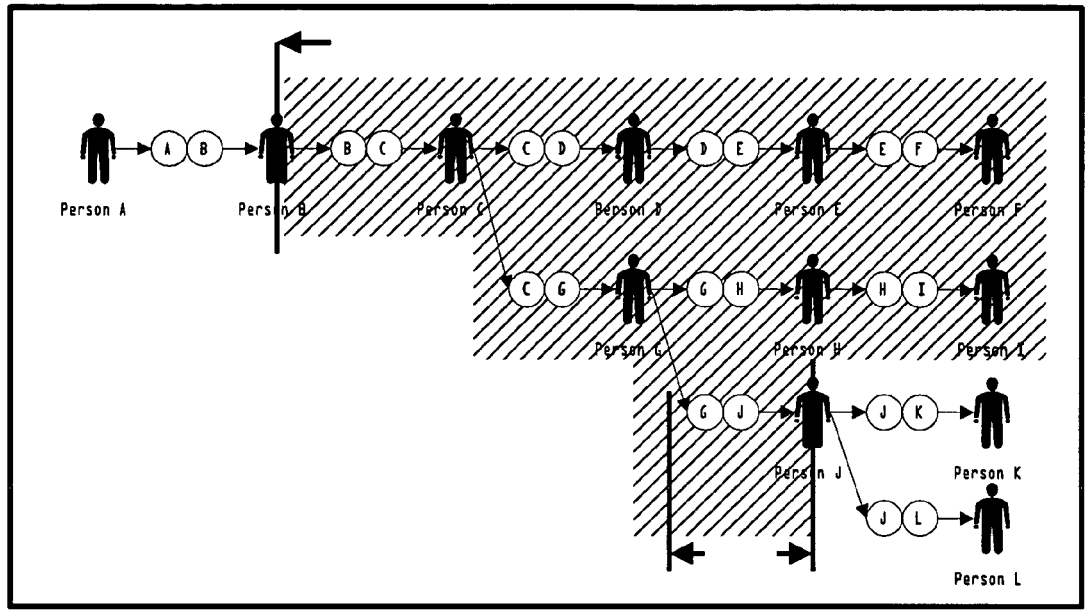
FIG. 31 depicts a further example of a report viewing constraint technique according to a preferred embodiment of the invention.
Figure 32:
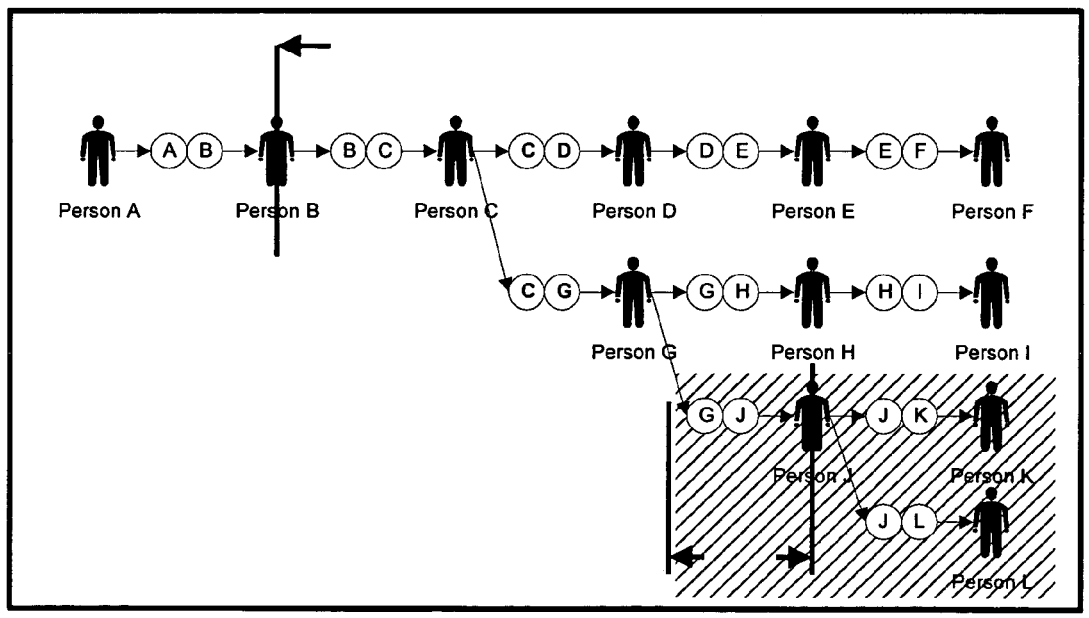
FIG. 32 depicts a further example of a report viewing constraint technique according to a preferred embodiment of the invention.

When a project member is a contract engineer or if the project or job is related to a personnel investigation, then it may be desirable to hide the details of the job from the requester and also hide an overview of the project. The system provides this ability by setting access prevention from up-stream and down-stream as illustrated in FIG. 29. As depicted in FIG. 29, "AB" means a requirement sent from person A to person B. Preferably, any person in the project can view the requirement tree until they reach an access ban. The vertical lines in FIG. 29 designate access bans in the direction of the arrows. The ranges of access for person A and person B are depicted in FIG. 30. The ranges of access for persons C, D, E, F, G, H, and I are depicted in FIG. 31. The range of access for persons J, K, and L, which represent outside contractors, are depicted in FIG. 32.

Figure 33:
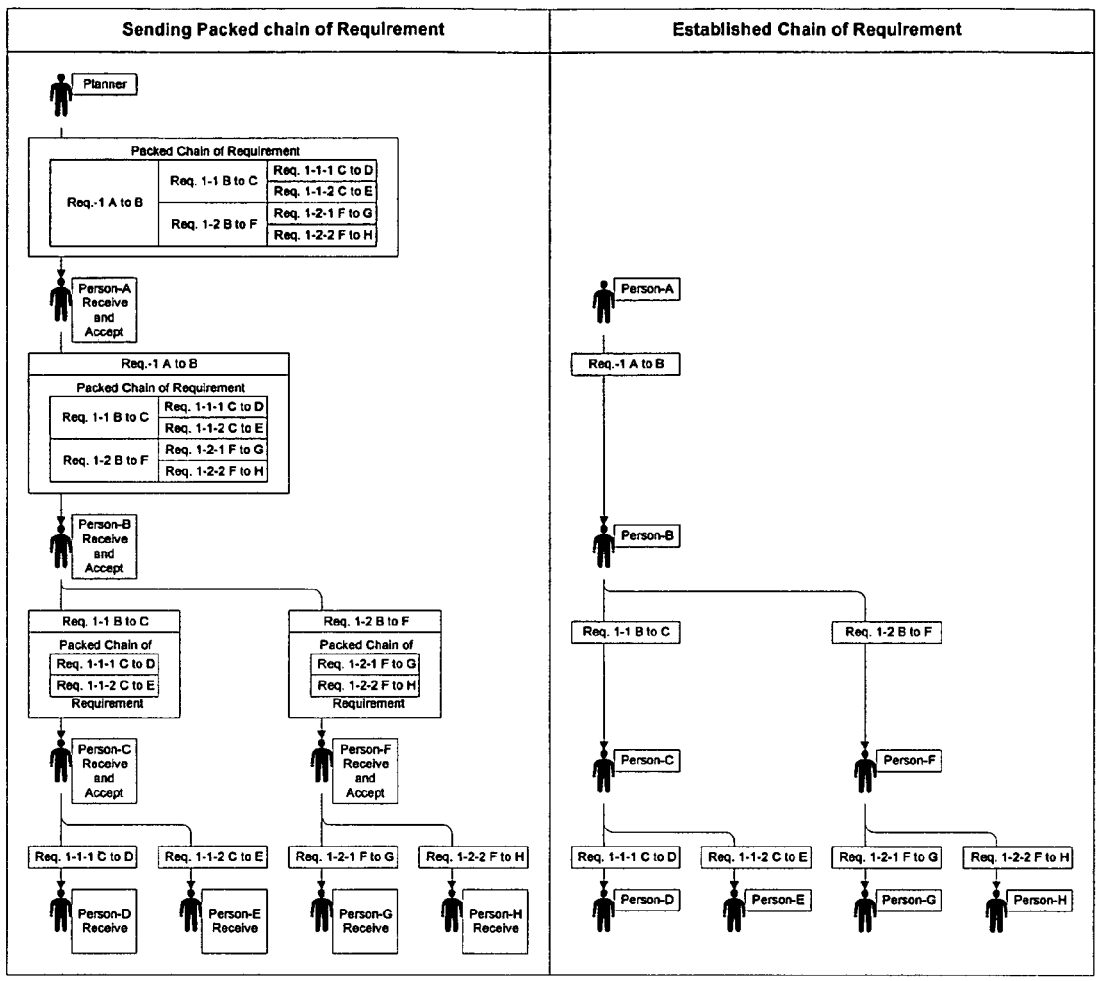
FIG. 33 depicts the use of a pre-packed requirement chain according to a preferred embodiment of the invention.

Some of the previously described embodiments are best suited for relatively small projects. For large projects, an alternate technique of pre-packed chained requests or routine job templates may preferably be used. The pre-packed chained request function is preferably used in the following way, as depicted in FIG. 33. First, a Planner or project manager opens the initial screen to develop a packed chain of requests and My_Jobs, but these are not sent to the actual receivers. Then, the Planner holds a meeting to get agreement for the total plan, which meeting can be handled out of the system. Next, the Planner sends pre-packed requirement chains to the top requirement sender, such as via email. The Top requirement sender opens the sent packed request email and pushes an "ACCEPT" button. At that time the system removes the first requirement from the chain and assigns it to the sender. The remaining requests are sent to the next people as specified in the chain. This process is repeated until the end requirements are reached.

This method is different from typical project manager centric systems in the following respects. Planning itself is done by a single planner, but to convert the developed requirement chain to actual requirements, the packed requirement must be sent and received by the actual responsible request sender and receiver. Also, the planning phase can be done by one person, but once the request is sent and received, each request sender has the responsibility to supervise his requirements execution, and each My_Job planner has the responsibility to conduct his job. Finally, it should be noted that this pre-packed requirement can be used not only for large, complex, or new projects, but also for daily and otherwise routine projects, so as to just eliminate the time that is required to create the sub-requirements, or not to forget to issue all the necessary requirements.

Figure 34:
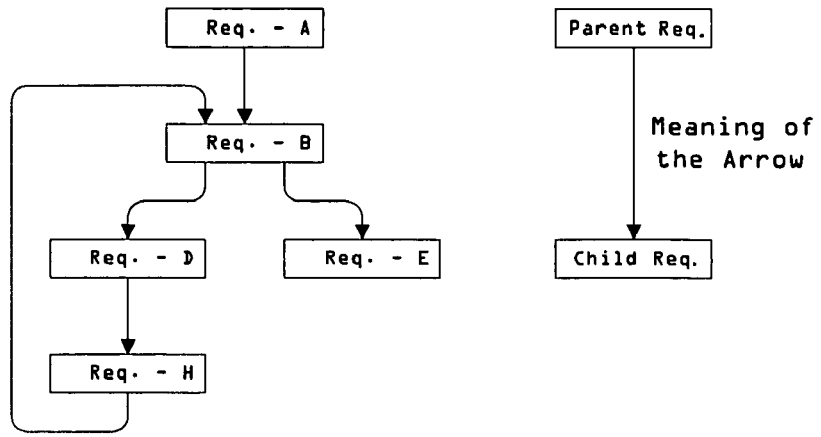
FIG. 34 depicts a logical recursion problem according to a preferred embodiment of the invention.

In preferred embodiments, the system employs a logical integrity assessment component to preferably prevent errors in Parent Child Relationships and Pre/Post Relationships. The system preferably allows each requirement to have multiple parents, so as to integrate jobs and requirements, and preferably also allows multiple child requirements or My_Jobs. However, with reference to FIG. 34, it is seen that Req.-B is linked to Req.-D, which is linked to Req.-H, which is linked to Req.-B, which is linked to Req.-D, which creates an endless loop. To prevent this recursion, the system preferably includes the restriction that a requirement's child requirement can not be set to it's parent requirement.

Figure 35:
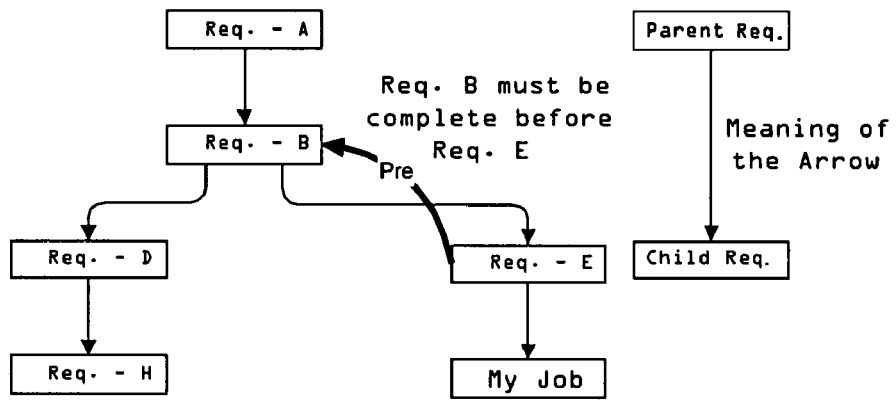
FIG. 35 depicts an alternate logical recursion problem according to a preferred embodiment of the invention.

FIG. 35 illustrates another potential logical problem. My_Job is awaiting the completion of Request B before starting. Request B completes when Req.-D and Req.-E (meaning My_Job) are complete. So both Request-B and My_Job are awaiting completion of each other, and My_Job status never becomes "CAN Start." Thus, the project is never finished. To prevent this situation, the system preferably provides the following restrictions. First, the system preferably does not allow any request or My_Job to set a Pre relationship to the requests which are existing up stream of the requirement. Second, the system preferably does not allow any request or My_Job to set a Post relationship to the requests which are existing down stream of the requirement.

It is not uncommon for a person to change responsibilities, so the system preferably supports such changes in responsibilities by accommodating request sender assignment changes, which change the request sender assignment from person A to B, and preferably also accommodating request receiver responsibility changes, which change the request receiver assignment from person A to B. These changes are preferably implemented by the following two processes. First, the current request receiver sends a responsibility transfer request to a new responsible person. Then the new responsible person accepts the offer. When the new responsible person accepts the offer of changing responsibility, the job responsibility moves from the current responsible person to the new responsible person.

It is noted that My_Job responsibility preferably can be changed with a direct requirement receiver change. The following relationship preferably exists: Requirement receiver=My_Job planner for the requirement. Thus, My_Job cannot transfer to another person by itself. My_Job is preferably transferred automatically when the requirement that created the My_Job is transferred to another person. In both cases, all contents of requirements and My_Jobs remain unchanged.

Some embodiments provide the ability to write a request to multiple persons by one document. For example consider a requirement, "XXX problem countermeasure," meaning XXX is a problem, and it is requested that the receiver gather information related to this matter and develop countermeasures and report to the sender. Details could be, for example, To Mr. XX: "Please list up all customers;" to Mr. YY: "Please contact each customer and gather problem information;" and To Mr. ZZ: "Please summarize the problem, develop countermeasures and report to me."

This request preferably has the following features: (1) They are related multiple requests to multiple persons; and (2) even though there are multiple requests, the request sender wants to write only once. To support this situation the system has the following function. First, when the system finds multiple "REQUEST TO" persons on the request writing screen, the system creates multiple copies of the request, most preferably one for each person. Second, the system automatically adds the person's name to the requirement title as a suffix as shown in Table 12:

TABLE 12

| Original Title | Request To | Synthesized Title |
| --- | --- | --- |
| XXX problem counter measure | John | XXX problem counter measure - John |
| | Mike | XXX problem counter measure - Mike |
| | Doc | XXX problem counter measure - Doc |
| | Chuck | XXX problem counter measure - Chuck |

The following examples are provided to further clarify certain features of some embodiments of the system according to the present invention.

EXAMPLE 1

Figure 36:
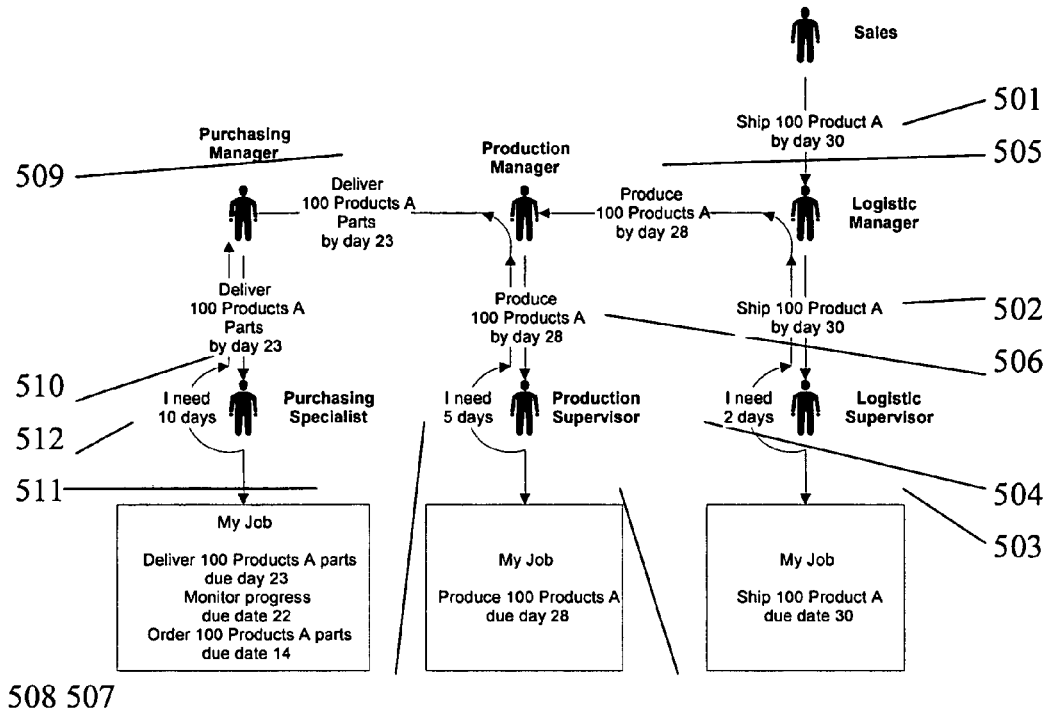
FIG. 36 depicts an example of interactions between requesters and receivers according to a preferred embodiment of the invention.

FIG. 36 illustrates the concept of one embodiment by using a shipping and product production scenario. In Step 1 501, a sales person requests a logistics manager to ship 100 units of product A by day 30. In Step 2 502, the logistics manager requests a logistic supervisor to ship 100 units of product A by day 30. In Step 3 503, the logistics supervisor plans his job to ship 100 units of product A by day 30. In Step 4, 504, the logistic supervisor reports to the logistic manager that two days are required to complete this job.

In Step 5 505, the logistics manager requests a production manager to produce 100 units of product A by day 28. In Step 6 506, the Production manager requests a production supervisor to produce 100 units of product A by day 28. In Step 7 507, the Production supervisor plans his job to produce 100 units of product A by day 28. In Step 8 508, the production supervisor reports to the production manager that five days are required to complete this job.

In Step 9 509, the production manager requests a purchasing manager to deliver 100 units of parts for product A by day 23. In Step 10 510, the purchasing manager requests a purchasing specialist to deliver 100 units of parts for product A by day 23. In Step 11 511, the purchasing specialist plans his job to deliver 100 units of parts for product A by day 23, and plans his job to monitor the progress of the parts delivery by day 22, and plans his job to order the parts for product A by day 14. In Step 12 512, the purchasing specialist reports to the purchasing manager that ten days are required to complete this job.

EXAMPLE 2

Figure 37:
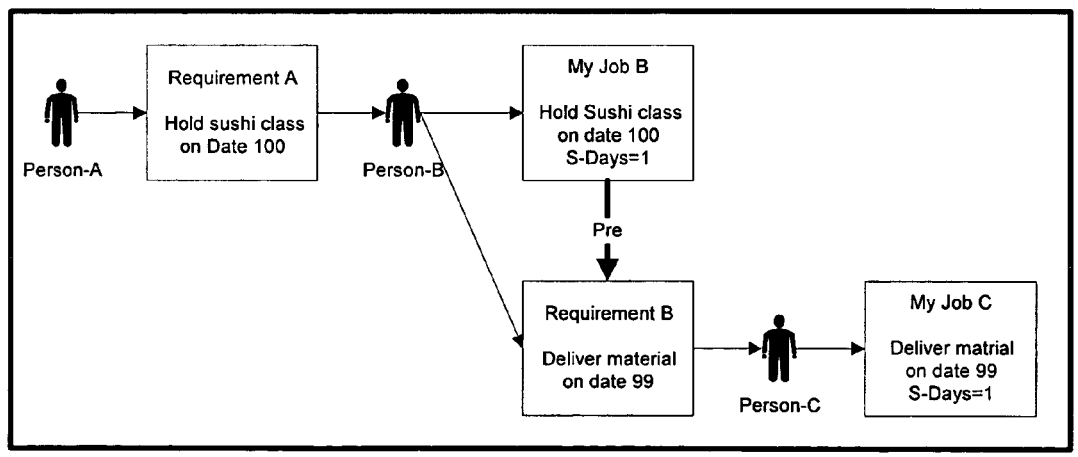
FIG. 37 depicts an example of pre/post requirements according to a preferred embodiment of the invention.

FIG. 37 illustrates how the system sets Pre/Post relationships by requirement, using the example of a cooking school, with a request to hold a sushi preparation class. In step 1, Person B plans My_Job B based on Requirement A. In step 2, Person B plans Requirement B based on Requirement A to person C. In step 3, Person B sets pre relationship from My_Job B to Requirement B, so Requirement B's due date becomes 99. In step 4, Person C plans My_Job C based on Requirement B, so My_Job C's due date becomes 99. This is the preferred method to set a Pre relationship between My_Job B and My_Job C via Requirement B. Requirement B has a pre relationship to My_Job B and this relationship creates a Pre relationship from My_Job B to My_Job C.

FIG. 38 illustrates an alternate user interface for the system, where right leaning hatching indicates a job that is completed by not confirmed, left leaning hatching indicates a requirement plan, cross hatching indicates a job that is confirmed, and blocked hatching indicates My-Jobs.

There is next provided a summary explanation of how to accomplish dual directional scheduling in the following three cases:

Case 1: A requirement has only a due date associated with it.

Case 2: A requirement has only a start date associated with it.

Case 3: A requirement has both a due date and a start date associated with it.

Case 1: A requirement has only a due date associated with it. This is the typically the most common case, and has been additionally explained elsewhere in this document, with a main procedure as next given:

1. Due date to past direction scheduling.
2. Find earliest day to start.
3. If today is earlier than the earliest day do nothing.
4. If earliest day is earlier day than today shift schedule by (Today−earliest day).

Case 2: A requirement has only a start date associated with it. A case such as this may arise in the following manner. When, for example, a major piece of equipment is purchased, a machine acceptance test is typically performed. A job is preferably created to issue a test report after the machine acceptance test. In this case, if a request is issued for someone to do the reporting job, the associated requirement only has a start date associated with it, which is after the acceptance date. If the requirement only has a start date, dual directional scheduling preferably works by start to future direction scheduling.

Case 3: A requirement has both a due date and a start date associated with it. A case such as this may arise in the following manner. When, for example, a major piece of equipment is purchased, a machine acceptance test is typically performed. A job is preferably created to issue a test report within one week after the machine acceptance test. In this case, the requirement has both a start date (after the acceptance date), and a due date (acceptance test date plus seven days) associated with it. If the requirement has both a start date and a due date associated with it, dual directional scheduling is preferably accomplished by the following steps:

1 Due date to past direction scheduling.
2. Find earliest day to start.
3 If earliest day is younger day than the start day, do nothing.
4 If earliest day is older day than the start day, shift schedule by (the start day−earliest day).

This is essentially the same procedure as that summarized above in regard to Case 1. Case 1 does not have an explicit start day, but Case 1 does have "today" as an implicit start day, because "today" is the earliest day on which the job can be started.

The foregoing description of preferred embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A processor-based method of detecting completion of a planning phase of a project, the method comprising the steps of:
   a. manually creating requests on a plurality of hierarchical levels, including highest, lower, and lowest hierarchical levels, including,
      i. an initial request on a highest hierarchical level, where the Initial Request defines the project in a lowest level of detail,
      ii. chains of sub-requests on lower hierarchical levels, where the sub-requests at the lower hierarchical levels further define the project in relatively higher level of detail as compared to the lowest level of detail, and
      iii. terminal requests on a lowest hierarchical level within each of the chains, the terminal requests having no further sub-requests,
      iv. wherein the initial request, the sub-requests, and the terminal requests are hierarchically linked,
   b. manually creating on at least some of the highest, lower, and lowest hierarchical levels one or more jobs necessary to realize the requests,
   c. manually assigning a status of Planned to a given request of the created requests when all requests and jobs at a next-lower hierarchical level of the plurality of hierarchical levels necessary to realize the given request have been created,
   d. manually assigning a status of All Planned to a given job of the created jobs after determining that a plan of the given job is fully developed,
   e. on the processor, automatically changing the status of a given one of the terminal requests from Planned to All Planned after determining that all jobs of the given one of the terminal requests have a status of All Planned,
   f. on the processor, automatically changing the status of a given one of the sub-requests at a given one of the lower hierarchical levels from Planned to All Planned after determining that all requests and jobs on all hierarchical levels linked below the given one of the lower hierarchical levels have a status of All Planned, thereby automatically propagating the status of All Planned up the plurality of hierarchical levels,
   g. on the processor, automatically changing the status of the initial request from Planned to All Planned after determining that all requests and jobs on all hierarchical levels linked below the highest hierarchical level have a status of All Planned,
   h. on the processor, automatically changing the status of the initial request from All Planned to Project All Planned, and
   i. on the processor, automatically propagating the status of Project All Planned down through all the plurality of hierarchical levels when the initial request has a status of Project All Planned.

2. A processor-based method of determining completion of a project, the method comprising the steps of:
   a. manually creating requests on a plurality of hierarchical levels, including highest, lower, and lowest hierarchical levels, including,
      i. an initial request on a highest hierarchical level, where the Initial Request defines the project in a lowest level of detail,
      ii. chains of sub-requests on lower hierarchical levels, where the sub-requests at the lower hierarchical levels further define the project in relatively higher level of detail as compared to the lowest level of detail, and
      iii. terminal requests on a lowest hierarchical level within each of the chains, the terminal requests having no further sub-requests,
      iv. wherein the initial request, the sub-requests, and the terminal requests are hierarchically linked,
   b. manually creating on at least some of the highest, lower, and lowest hierarchical levels one or more jobs necessary to realize the requests,
   c. manually assigning a status of Completed to a given job of the created jobs after determining that it is completed,
   d. on the processor, automatically assigning a status of Completed to a given one of the terminal requests after determining that all jobs of the given one of the terminal requests have a status of Completed,
   e. on the processor, automatically changing the status of a given one of the sub-requests at a given one of the lower hierarchical levels from Completed to Confirmed after determining that an issuer of the given one of the sub-requests is also a receiver of the given one of the sub-requests, and after determining that the issuer of the given one of the sub-requests is not the receiver of the given one of the sub-requests, on the processor, automatically requesting the issuer of the given one of the sub-requests to change the status of the given one of the sub-requests to only one of Confirmed and Refused, and f. on the processor, automatically assigning a status of Completed to a given one of the sub-requests at a given one of the lower hierarchical levels after determining that all sub-requests on a next lower hierarchical level of the plurality of hierarchical levels in its a particular chain of the given one of the sub-requests have a status of Confirmed and all jobs on a next lower hierarchical level of the plurality of hierarchical levels in a particular chain of the given one of the sub-requests have a status of Completed, thereby automatically propagating the statuses of Completed and Confirmed up the plurality of hierarchical levels by iterating steps (e) and (f) on the processor.

3. The processor-based method of claim 2, further comprising the steps of:
 a. on the processor, automatically assigning a status of Can Start to a given one of the created jobs after determining that the given one of the created jobs is not dependent upon any prerequisite request completions, and
 b. on the processor, automatically assigning a status of Can Start to a given one of the created jobs after determining that all prerequisite requests for the given one of the created jobs have a status of Confirmed.

\* \* \* \* \*